US012526772B2

(12) United States Patent
Park et al.

(10) Patent No.: US 12,526,772 B2
(45) Date of Patent: Jan. 13, 2026

(54) METHOD AND APPARATUS FOR TRANSMITTING AND RECEIVING SIDELINK DATA IN A WIRELESS COMMUNICATION SYSTEM

(71) Applicant: LG ELECTRONICS INC., Seoul (KR)

(72) Inventors: Giwon Park, Seoul (KR); Seoyoung Back, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 499 days.

(21) Appl. No.: 17/990,630

(22) Filed: Nov. 18, 2022

(65) Prior Publication Data

US 2023/0300797 A1    Sep. 21, 2023

(30) Foreign Application Priority Data

Nov. 19, 2021    (KR) .................. 10-2021-0160240

(51) Int. Cl.
*H04W 72/02* (2009.01)
*H04W 72/25* (2023.01)
*H04W 72/542* (2023.01)

(52) U.S. Cl.
CPC ........... *H04W 72/02* (2013.01); *H04W 72/25* (2023.01); *H04W 72/542* (2023.01)

(58) Field of Classification Search
CPC ... H04W 76/28; H04W 4/40; H04W 52/0232; H04W 52/0219; H04W 72/25; H04W 72/541
See application file for complete search history.

(56) References Cited

U.S. PATENT DOCUMENTS

| 2023/0104340 A1* | 4/2023 | Park ................. H04W 52/0216 370/329 |
| 2023/0208563 A1* | 6/2023 | Liang ................ H04L 1/1851 370/311 |
| 2024/0015840 A1* | 1/2024 | Li ...................... H04W 72/40 |

OTHER PUBLICATIONS

European Patent Office Application Serial No. 22896135.5, Search Report dated Jan. 3, 2025, 12 pages.
Huawei, HiSilicon, "Consideration on the sidelink DRX for unicast, groupcast and broadcast", R2-2009413, 3GPP TSG-RAN WG2 Meeting #112 electronic, Nov. 2020, 8 pages.
Ericsson, "Remaining aspects of SL DRX", R2-2109907, 3GPP TSG-RAN WG2 #116-e, Nov. 2021, 13 pages.
(Continued)

*Primary Examiner* — Iqbal Zaidi
(74) *Attorney, Agent, or Firm* — LEE, HONG, DEGERMAN, KANG & WAIMEY

(57) ABSTRACT

A method for a first user equipment (UE) to perform sidelink communication in a wireless communication system according to an embodiment of the present disclosure, the method comprises creating a sidelink grant related to resource allocation mode 2, transmitting, to a second UE, the PSCCH and transmitting, to the second UE, the PSSCH. Based on 1) the second UE behaving based on a SideLink Discontinuous Reception (SL DRX) configuration, and 2) the at least one duration related to the PSCCH and a second stage SCI related to the PSSCH, for transmission of a Medium Access Control Protocol Data Unit (MAC PDU) which is based on the sidelink grant, not being in a SL DRX active time of the second UE: a reselection of the resource based on the resource allocation mode 2 is triggered.

9 Claims, 20 Drawing Sheets

(56) References Cited

OTHER PUBLICATIONS

3rd Generation Partnership Project; Technical Specification Group Radio Access Network; NR; Medium Access Control (MAC) protocol specification (Release 16), 3GPP TS 38.321 V16.2.0, Sep. 2020, 154 pages.

* cited by examiner

BS(e.g. eNB or gNB)

UE 1    UE 2

(a)

(b)

METHOD AND APPARATUS FOR TRANSMITTING AND RECEIVING SIDELINK DATA IN A WIRELESS COMMUNICATION SYSTEM

CROSS-REFERENCE TO RELATED APPLICATION

Pursuant to 35 U.S.C. § 119(a), this application claims the benefit of earlier filing date and right of priority to Korean Patent Application No. 10-2021-0160240, filed on Nov. 19, 2021, the contents of which are hereby incorporated by reference herein in its entirety.

BACKGROUND OF THE INVENTION

Field of the Invention

The present disclosure relates to a method and apparatus for transmitting and receiving sidelink data in a wireless communication system.

Description of the Related Art

A wireless communication system is a multiple access system that supports communication of multiple users by sharing available system resources (e.g., a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

As a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

In a Discontinuous Reception (DRX) operation, the UE monitors a PDCCH only during an active time determined based on a DRX configuration (e.g. drx-onDurationTimer, other active time related timers). The UE does not monitor the PDCCH during inactive time. Accordingly, power consumption of the UE can be reduced based on the DRX operation.

Based on the prior art, the DRX operation is not supported in reception of SCI (Sidelink Control Information, first stage SCI and second stage SCI) for sidelink communication. That is, a UE (hereinafter, a Rel-16 UE) performing sidelink communication based on the conventional method continuously performs a monitoring operation for receiving the SCI without interruption. Since this operation is inefficient in terms of UE power consumption, sidelink DRX (SL DRX) was introduced in Rel-17. The UE supporting the SL DRX (hereinafter, a Rel-17 UE) monitors the SCI (first stage SCI & second stage SCI) only during an active time determined based on the SL DRX configuration.

SUMMARY OF THE INVENTION

The resource selected based on resource allocation mode 2 may not belong to the SL DRX active time of the receiving UE.

For example, the transmitting UE may select a resource based on resource allocation mode 2 without considering the active time based on the SL DRX configuration of the receiving UE.

For example, even if the transmitting UE selects a resource based on resource allocation mode 2 in consideration of the active time based on the SL DRX configuration of the receiving UE, the selected resource may not belong to an actual SL DRX active time of the receiving UE. That is, the SL DRX active time of the receiving UE determined by the transmitting UE may be different from the actual SL DRX active time of the receiving UE. As a more specific example, assuming that the SCI is normally received by the receiving UE, the transmitting UE may determine the SL DRX active time based on the SL DRX inactivity timer. However, when the receiving UE fails to receive the SCI, the SL DRX inactivity timer does not operate. In this case, the SL DRX active time determined by the transmitting UE may be different from the SL DRX active time of the receiving UE.

As in the above examples, not only when the transmitting UE does not consider an SL DRX operation of the receiving UE, but also when the transmitting UE does consider the SL DRX operation (i.e. SL DRX active time) of the receiving UE, resources that are not included in the actual SL DRX active time of the receiving UE may be selected by the transmitting UE based on the resource allocation mode 2.

Since sidelink communication may be performed based on resources that do not conform to the SL DRX operation of the receiving UE as described above, the following problems i) and ii) occur.

i) Since the receiving UE not in SL DRX active time cannot receive the PSCCH/PSSCH of the transmitting UE, unnecessary signaling overhead is caused.

ii) Since the failure probability of PSCCH/PSSCH transmission for the receiving UE performing the SL DRX operation increases, more power may be required for the success of PSCCH/PSSCH transmission in terms of the transmitting UE. In other words, since the transmitting UE transmits a sidelink signal to a UE unable to receive signals frequently, power consumption of the transmission UE performing sidelink communication increases.

An object of the present disclosure is to propose a sidelink communication method for solving the above problems.

Objects of the present disclosure are not limited to the foregoing, and other unmentioned objects would be apparent to one of ordinary skill in the art from the following description.

A method for a first user equipment (UE) to perform sidelink communication in a wireless communication system according to an embodiment of the present disclosure, the method comprises creating a sidelink grant related to resource allocation mode 2, transmitting, to a second UE, the PSCCH and transmitting, to the second UE, the PSSCH. A set of at least one duration related to a Physical Sidelink Control Channel (PSCCH) and a set of at least one duration related to a Physical Sidelink Shared Channel (PSSCH) are determined based on the sidelink grant.

The PSCCH and the PSSCH are transmitted in a resource based on the resource allocation mode 2.

Based on 1) the second UE behaving based on a SideLink Discontinuous Reception (SL DRX) configuration, and 2) the at least one duration related to the PSCCH and a second stage SCI related to the PSSCH, for transmission of a Medium Access Control Protocol Data Unit (MAC PDU) which is based on the sidelink grant, not being in a SL DRX active time of the second UE: a reselection of the resource based on the resource allocation mode 2 is triggered.

The SL DRX active time may be determined based on an SL DRX timer. The SL DRX timer may include an SL DRX timer running in the second UE or an SL DRX timer to be run in the second UE.

Based on the reselection of the resource based on the resource allocation mode 2 being triggered, an MAC entity of the first UE may indicate the SL DRX active time of the second UE to a physical layer of the first UE.

Based on a resource selection mechanism related to the resource allocation mode 2 being random selection, a resource may be selected from a resource pool within the indicated SL DRX active time.

Based on the resource selection mechanism related to the resource allocation mode 2 being full sensing or partial sensing, a resource may be selected from resources indicated by the physical layer of the first UE within the indicated SL DRX active time.

The selected resource may be time and frequency resources for one transmission opportunity.

The SL DRX timer may include at least one of SL DRX onDurationTimer, SL DRX InactivityTimer, or SL DRX RetransmissionTimer.

After the sidelink grant is cleared, the reselection of resource based on the resource allocation mode 2 may be triggered.

The MAC PDU may be created based on selection of a logical channel related to the sidelink grant.

The logical channel may be a logical channel to which a destination that is in the SL DRX active time belongs.

The MAC PDU may be obtained from the sidelink grant. Based on the at least one duration related to the PSCCH for transmission of the MAC PDU which is based on the sidelink grant and the second stage SCI related to the PSSCH, not being in the SL DRX active time of the second UE, the MAC PDU may not be obtained from the sidelink grant and the sidelink grant may not be used.

A first user equipment (UE) performing sidelink communication in a wireless communication system according to another embodiment of the present disclosure, the first UE comprises one or more transceivers, one or more processors controlling the one or more transceivers, and one or more memories operably connected to the one or more processors.

The one or more memories store instructions for performing operations based on being executed by the one or more processors.

The operations includes creating a sidelink grant related to resource allocation mode 2, transmitting, to a second UE, the PSCCH, and transmitting, to the second UE, the PSSCH. A set of at least one duration related to a Physical Sidelink Control Channel (PSCCH) and a set of at least one duration related to a Physical Sidelink Shared Channel (PSSCH) are determined based on the sidelink grant.

The PSCCH and the PSSCH are transmitted in a resource based on the resource allocation mode 2.

Based on 1) the second UE behaving based on a SideLink Discontinuous Reception (SL DRX) configuration, and 2) the at least one duration related to the PSCCH and a second stage SCI related to the PSSCH, for transmission of a Medium Access Control Protocol Data Unit (MAC PDU) which is based on the sidelink grant, not being in a SL DRX active time of the second UE: a reselection of the resource based on the resource allocation mode 2 is triggered.

An apparatus controlling a first user equipment (UE) to perform sidelink communication in a wireless communication system according to still another embodiment of the present disclosure, the apparatus comprises one or more processors and one or more memories operably connected to the one or more processors.

The one or more memories store instructions for performing operations based on being executed by the one or more processors.

The operations includes creating a sidelink grant related to resource allocation mode 2, transmitting, to a second UE, the PSCCH, and transmitting, to the second UE, the PSSCH. A set of at least one duration related to a Physical Sidelink Control Channel (PSCCH) and a set of at least one duration related to a Physical Sidelink Shared Channel (PSSCH) are determined based on the sidelink grant.

The PSCCH and the PSSCH are transmitted in a resource based on the resource allocation mode 2.

Based on 1) the second UE behaving based on a SideLink Discontinuous Reception (SL DRX) configuration, and 2) the at least one duration related to the PSCCH and a second stage SCI related to the PSSCH, for transmission of a Medium Access Control Protocol Data Unit (MAC PDU) which is based on the sidelink grant, not being in a SL DRX active time of the second UE: a reselection of the resource based on the resource allocation mode 2 is triggered.

One or more non-transitory computer-readable medium according to still another embodiment of the present disclosure stores one or more instructions. The one or more instructions perform operations based on being executed by one or more processors.

The operations includes creating a sidelink grant related to resource allocation mode 2, transmitting, to a second UE, the PSCCH, and transmitting, to the second UE, the PSSCH. A set of at least one duration related to a Physical Sidelink Control Channel (PSCCH) and a set of at least one duration related to a Physical Sidelink Shared Channel (PSSCH) are determined based on the sidelink grant.

The PSCCH and the PSSCH are transmitted in a resource based on the resource allocation mode 2.

Based on 1) the second UE behaving based on a SideLink Discontinuous Reception (SL DRX) configuration, and 2) the at least one duration related to the PSCCH and a second stage SCI related to the PSSCH, for transmission of a Medium Access Control Protocol Data Unit (MAC PDU) which is based on the sidelink grant, not being in a SL DRX active time of the second UE: a reselection of the resource based on the resource allocation mode 2 is triggered.

A method for a second user equipment (UE) to perform sidelink communication in a wireless communication system according to still another embodiment of the present disclosure, the method comprises receiving, from a first UE, a Physical Sidelink Control Channel (PSCCH) and receiving, from the first UE, a Physical Sidelink Shared Channel (PSSCH).

The PSCCH and the PSSCH are received in a resource based on a resource allocation mode 2.

Based on the second UE behaving based on a SideLink Discontinuous Reception (SL DRX) configuration, the resource based on the resource allocation mode 2 is a resource in a SL DRX active time of the second UE.

A second user equipment (UE) performing sidelink communication in a wireless communication system according to still another embodiment of the present disclosure, the second UE comprises one or more transceivers, one or more processors controlling the one or more transceivers, and one or more memories operably connected to the one or more processors.

The one or more memories store instructions for performing operations based on being executed by the one or more processors.

The operations includes receiving, from a first UE, a Physical Sidelink Control Channel (PSCCH) and receiving, from the first UE, a Physical Sidelink Shared Channel (PSSCH).

The PSCCH and the PSSCH are received in a resource based on a resource allocation mode 2.

Based on the second UE behaving based on a SideLink Discontinuous Reception (SL DRX) configuration, the resource based on the resource allocation mode 2 is a resource in a SL DRX active time of the second UE.

According to an embodiment of the present disclosure, a sidelink grant related to resource allocation mode 2 is created. When the duration of the PSCCH based on the sidelink grant and the SCI related to the PSSCH are not in the SL DRX active time of the second UE, the first UE performs resource reselection. Accordingly, it is possible to prevent resources that do not conform to the SL DRX operation of the receiving UE from being used for sidelink communication. Through this, it is possible to prevent an unnecessary increase in signaling overhead and power consumption of the transmitting UE. In addition, reliability of sidelink communication based on resource allocation mode 2 supported by SL DRX can be improved.

Effects of the present disclosure are not limited to the foregoing, and other unmentioned effects would be apparent to one of ordinary skill in the art from the following description.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

DETAILED DESCRIPTION OF THE EMBODIMENTS

Figure 1:
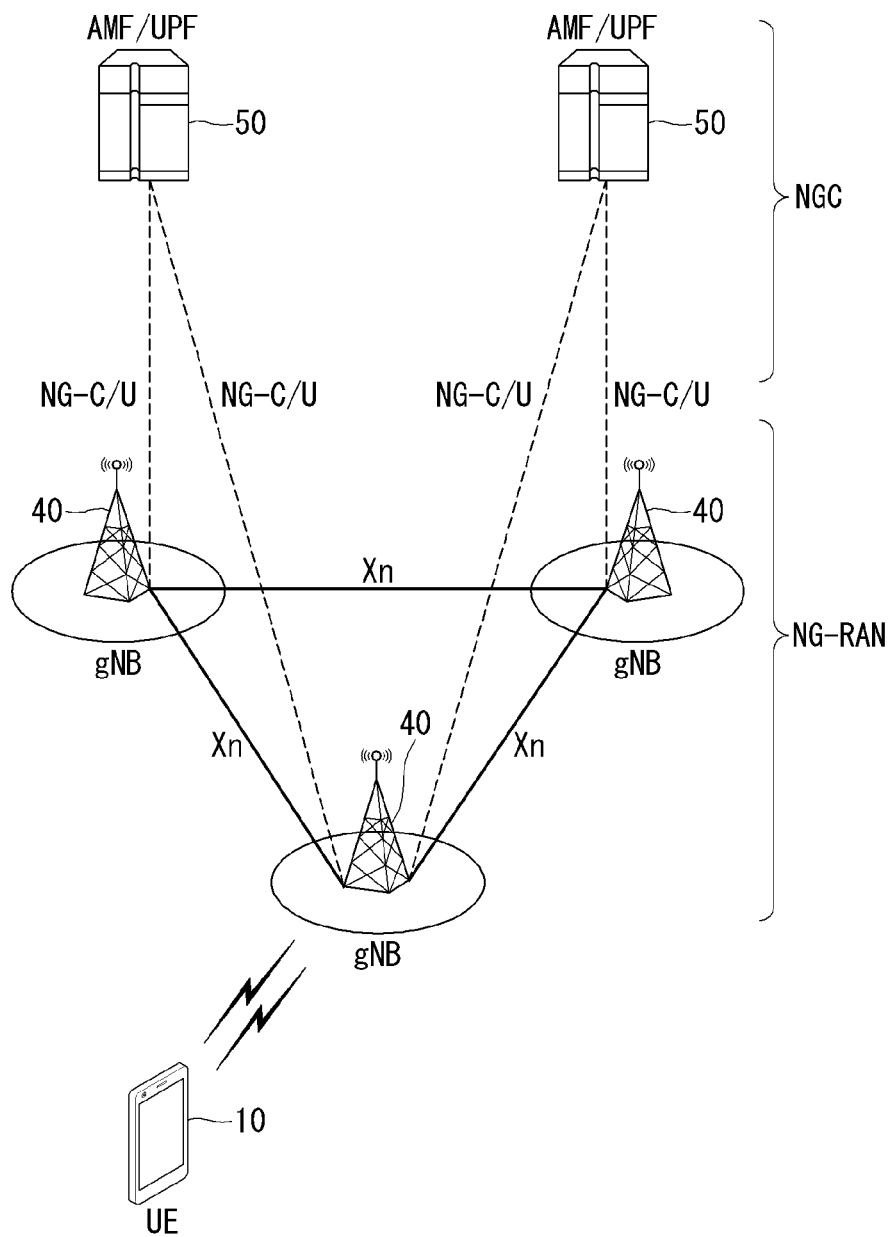
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the following document may be referred to.

| 3GPP LTE | 3GPP NR (e.g. 5G) |
|---|---|
| 3GPP TS 36.211: Physical channels and modulation | 3GPP TS 38.211: Physical channels and modulation |
| 3GPP TS 36.212: Multiplexing and channel coding | 3GPP TS 38.212: Multiplexing and channel coding |
| 3GPP TS 36.213: Physical layer procedures | 3GPP TS 38.213: Physical layer procedures for control |
| 3GPP TS 36.214: Physical layer; Measurements | 3GPP TS 38.214: Physical layer procedures for data |
| 3GPP TS 36.300: Overall description | 3GPP TS 38.215: Physical layer measurements |
| 3GPP TS 36.304: User Equipment (UE) procedures in idle mode | 3GPP TS 38.300: Overall description |
| 3GPP TS 36.314: Layer 2 - Measurements | 3GPP TS 38.304: User Equipment (UE) procedures in idle mode and in RRC inactive state |
| 3GPP TS 36.321: Medium Access Control (MAC) protocol | 3GPP TS 38.322: Radio Link Control (RLC) protocol |
| 3GPP TS 36.323: Packet Data Convergence Protocol (PDCP) | 3GPP TS 38.322: Radio Link Control (RLC) protocol |
| 3GPP TS 36.331: Radio Resource Control (RRC) protocol | 3GPP TS 38.323: Packet Data Convergence Protocol (PDCP) |
| | 3GPP TS 38.331: Radio Resource Control (RRC) protocol |
| | 3GPP TS 37.324: Service Data Adaptation Protocol (SDAP) |
| | 3GPP TS 37.340: Multi-connectivity; Overall description |

FIG. 1 shows a structure of an NR system, based on an embodiment of the present disclosure.

Referring to FIG. 1, a Next Generation—Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 2:
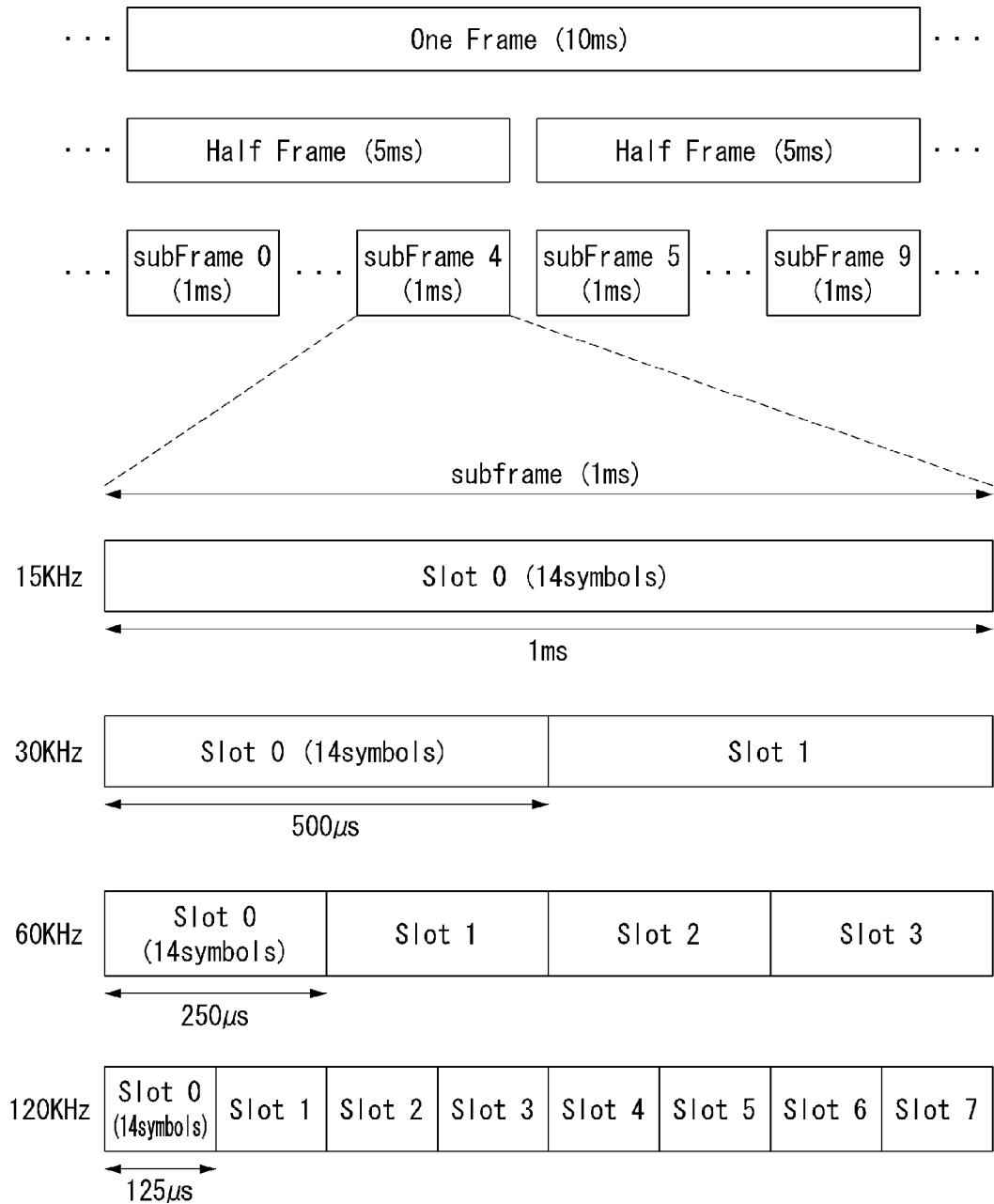
FIG. 2 shows a structure of a radio frame of an NR, based on an embodiment of the present disclosure.

FIG. 2 shows a structure of a radio frame of an NR, based on an embodiment of the present disclosure.

Referring to FIG. 2, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols based on a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot (Nslotsymb), a number slots per frame (Nframe,uslot), and a number of slots per subframe (Nsubframe,uslot) based on an SCS configuration (u), in a case where a normal CP is used.

TABLE 1

| SCS $(15*2^u)$ | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15*2$^u$) | $N^{slot}_{symb}$ | $N^{frame, u}_{slot}$ | $N^{subframe, u}_{slot}$ |
|---|---|---|---|
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range Designation | Corresponding Frequency Range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range Designation | Corresponding Frequency Range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 3:
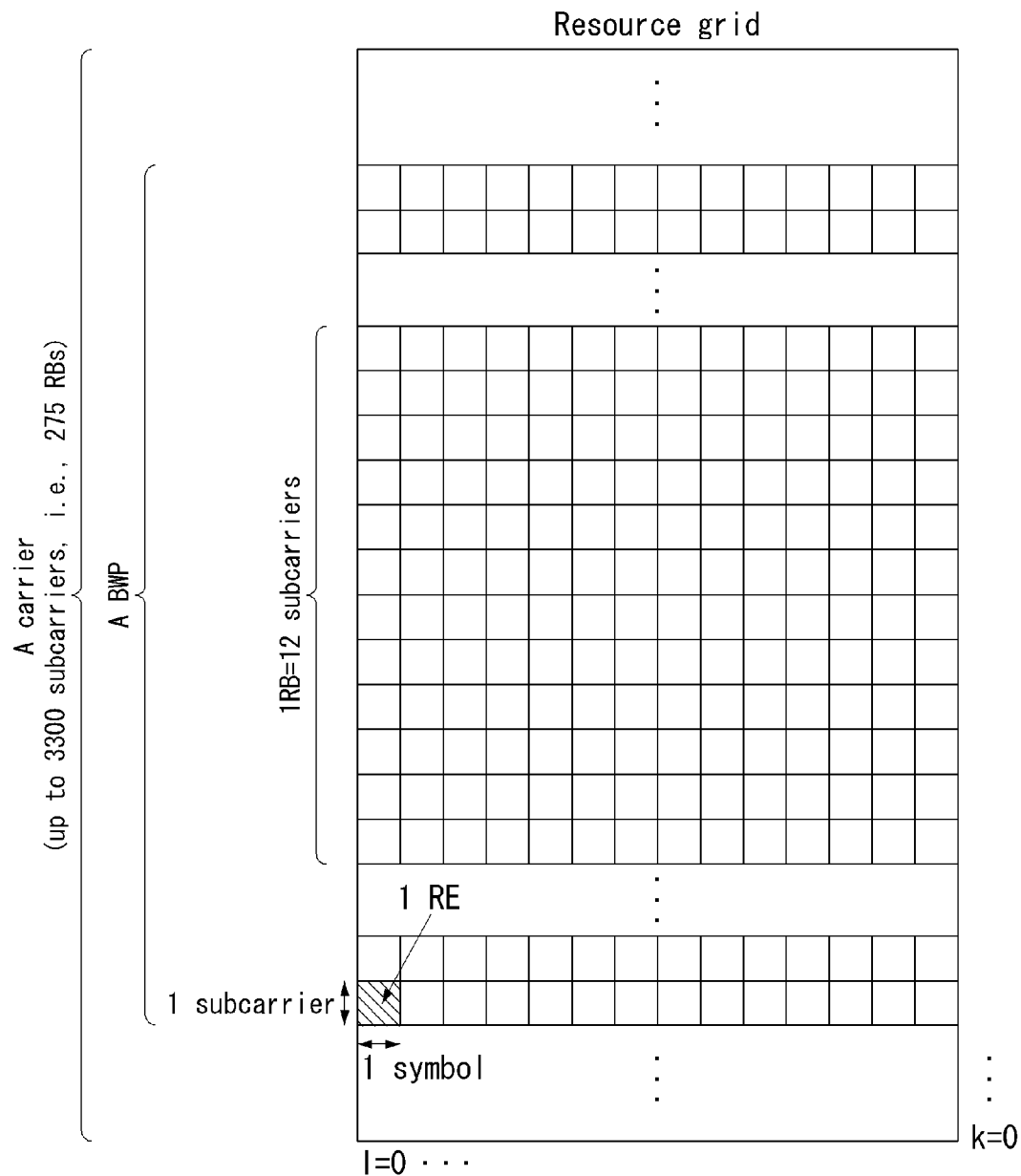
FIG. 3 shows a structure of a slot of an NR frame, based on an embodiment of the present disclosure.

FIG. 3 shows a structure of a slot of an NR frame, based on an embodiment of the present disclosure.

Referring to FIG. 3, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

A radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Sidelink Synchronization Signal (SLSS) and Synchronization Information

The SLSS may be an SL-specific sequence and include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and/or for synchronization acquisition. For example, the UE may use the S-PSS and the S-SSS for acquisition of fine synchronization and/or for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

A plurality of numerologies having different SCSs and/or CP lengths may be supported in an NR SL system. In this case, a length of a time resource used by a transmitting UE to transmit the S-SSB may be decreased along with an increase in the SCS. Accordingly, coverage of the S-SSB may be decreased. Therefore, in order to ensure the coverage of the S-SSB, the transmitting UE may transmit one or more S-SSBs to a receiving UE within one S-SSB transmission period based on the SCS. For example, the number of S-SSBs transmitted by the transmitting UE to the receiving UE within one S-SSB transmission period may be pre-configured or configured to the transmitting UE. For example, an S-SSB transmission period may be 160 ms. For example, the S-SSB transmission period of 160 ms may be supported for all SCSs.

Figure 4:
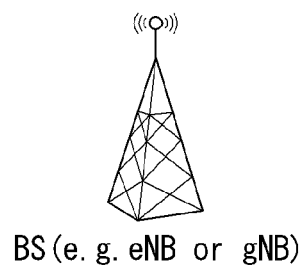
FIG. 4 shows a UE performing V2X or SL communication based on an embodiment of the present disclosure.
Figure 4:

FIG. 4 shows a UE performing V2X or SL communication based on an embodiment of the present disclosure.

Referring to FIG. 4, in V2X or SL communication, the term 'UE' may generally imply a UE of a user. However, if a network equipment such as a BS transmits/receives a signal based on a communication scheme between UEs, the BS may also be regarded as a sort of the UE. For example, a UE 1 may be a first device 100, and a UE 2 may be a second device 200.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

Figure 5:
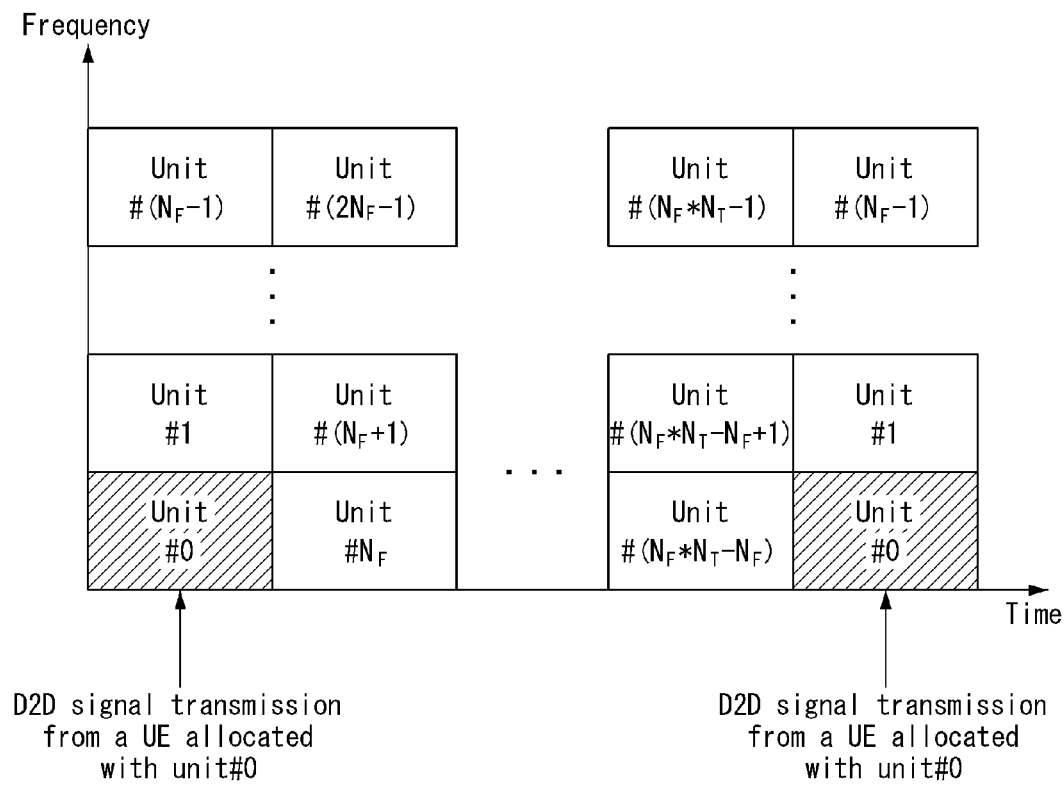
FIG. 5 shows a resource unit for V2X or SL communication based on an embodiment of the present disclosure.

FIG. 5 shows a resource unit for V2X or SL communication based on an embodiment of the present disclosure.

Referring to FIG. 5, all frequency resources of a resource pool may be divided into NF resources, and all time resources of the resource pool may be divided into NT resources. Therefore, NF*NT resource units may be defined in the resource pool. FIG. 5 may show an example of a case where a corresponding resource pool is repeated with a period of NT subframes.

As shown in FIG. 5, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

(2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Resource Allocation in SL

Figure 6:
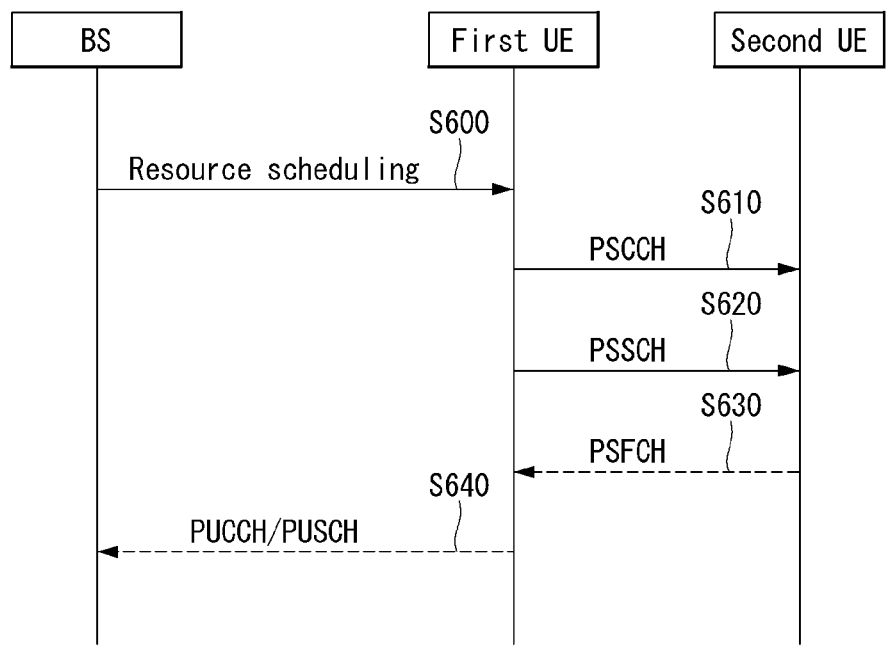
FIG. 6 shows a procedure of performing V2X or SL communication by a UE based on a transmission mode, based on an embodiment of the present disclosure.
Figure 6:
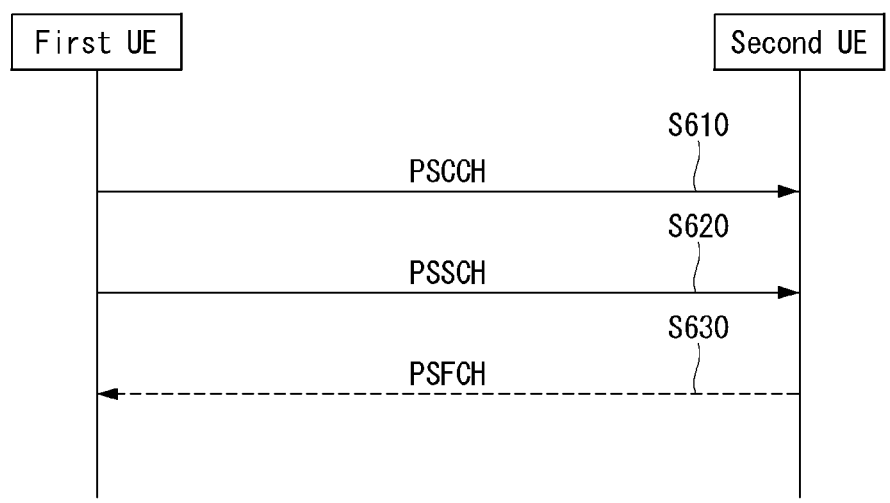

FIG. 6 shows a procedure of performing V2X or SL communication by a UE based on a transmission mode, based on an embodiment of the present disclosure.

The embodiment of FIG. 6 may be combined with various embodiments of the present disclosure. In various embodiments of the present disclosure, the transmission mode may be referred to as a mode or a resource allocation mode. Hereinafter, for convenience of explanation, in LTE, the transmission mode may be referred to as an LTE transmission mode. In NR, the transmission mode may be referred to as an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 5 shows an example of a DCI for SL scheduling.

TABLE 5

| 3GPP TS 38.212 |
|---|
| 7.3.1.4.1 Format 3_0 |
| DCI format 3_0 is used for scheduling of NR PSCCH and NR PSSCH in one cell. |
| The following information is transmitted by means of the DCI format 3_0 with CRC scrambled by SL-RNTI or SL-CS-RNTI: |
| - Resource pool index -[$\log_2$ I] bits, where I is the number of resource pools for transmission configured by the higher layer parameter sl-TxPoolScheduling. |
| - Time gap - 3 bits determined by higher layer parameter sl-DCI-ToSL-Trans, as defined in clause 8.1.2.1 of [6, TS 38.214] |
| - HARQ process number - 4 bits as defined in clause 16.4 of [5, TS 38.213] |
| - New data indicator - 1 bit as defined in clause 16.4 of [5, TS 38.213] |
| - Lowest index of the subchannel allocation to the initial transmission -[$\log_2(N_{subChannel}^{SL})$] bits as defined in clause 8.1.2.2 of [6, TS 38.214] |
| - SCI format 1-A fields according to clause 8.3.1.1: |
| - Frequency resource assignment. |
| - Time resource assignment. |
| - PSFCH-to-HARQ feedback timing indicator -[$\log_2 N_{fb\_timing}$] bits, where $N_{fb\_timing}$ is the number of entries in the higher layer parameter sl-PSFCH-ToPUCCH, as defined in clause 16.5 of [5, TS 38.213] |
| - PUCCH resource indicator - 3 bits as defined in clause 16.5 of [5, TS 38.213]. |
| - Configuration index - 0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC scrambled by SL-RNTI. |
| - Counter sidelink assignment index - 2 bits |
| - 2 bits as defined in clause 16.5.2 of [5, TS 38.213] if the UE is configured with pdsch-HARQ-ACK-Codebook = dynamic |
| - 2 bits as defined in clause 16.5.1 of [5, TS 38.213] if the UE is configured with pdsch-HARQ-ACK-Codebook = semi-static |
| - Padding bits, if required |
| 7.3.1.4.2 Format 3_1 |
| DCI format 3_1 is used for scheduling of LTE PSCCH and LTE PSSCH in one cell. |
| The following information is transmitted by means of the DCI format 3_1 with CRC scrambled by SL-L-CS-RNTI: |
| - Timing offset - 3 bits determined by higher layer parameter sl-TimeOffsetEUTRA, as defined in clause 16.6 of [5, TS 38.213] |
| - Carrier indicator -3 bits as defined in 5.3.3.1.9A of [11, TS 36.212]. |
| - Lowest index of the subchannel allocation to the initial transmission - [$\log_2(N_{subchannel}^{SL})$] bits as defined in 5.3.3.1.9A of [11, TS 36.212]. |
| - Frequency resource location of initial transmission and retransmission, as defined in 5.3.3.1.9A of [11, TS 36.212] |
| - Time gap between initial transmission and retransmission, as defined in 5.3.3.1.9A of [11, |

TABLE 5-continued

3GPP TS 38.212

TS 36.212]
- SL index - 2 bits as defined in 5.3.3.1.9A of [11, TS 36.212]
- SL SPS configuration index - 3 bits as defined in clause 5.3.3.1.9A of [11, TS 36.212].
- Activation/release indication - 1 bit as defined in clause 5.3.3.1.9A of [11, TS 36.212].

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B. Table 6 shows an example of a 1st-stage SCI format.

TABLE 6

3GPP TS 38.212

8.3.1.1 SCI format 1-A
SCI format 1-A is used for the scheduling of PSSCH and $2^{nd}$-stage-SCI on PSSCH
The following information is transmitted by means of the SCI format 1-A:
   Priority - 3 bits as specified in clause 5.4.3.3 of [12, TS 23.287] and clause 5.22.1.3.1 of [8, TS 38.321].

Frequency resource assignment - $\left\lceil \log_2 \left( \frac{N_{subChannel}^{SL}(N_{subChannel}^{SL}+1)}{2} \right) \right\rceil$ bits when the value of the higher layer parameter sl-MaxNumPerReserve is configured to 2; otherwise $\left\lceil \log_2 \left( \frac{N_{subChannel}^{SL}(N_{subChannel}^{SL}+1)(2N_{subChannel}^{SL}+1)}{6} \right) \right\rceil$ bits when the value of the higher layer parameter sl- MaxNumPerReserve is configured to 3, as defined in clause 8.1.2.2 of [6, TS 38.214].
   Time resource assignment - 5 bits when the value of the higher layer parameter sl-
MaxNumPerReserve is configured to 2; otherwise 9 bits when the value of the higher layer
parameter sl-MaxNumPerReserve is configured to 3, as defined in clause 8.1.2.1 of [6, TS 38.214].
   Resource reservation period - $\lceil \log_2 N_{rsv\_period} \rceil$ bits as defined in clause 8.1.4 of [6, TS
38.214], where $N_{rsv\_period}$ is the number of entries in the higher layer parameter sl-
ResourceReservePeriodList, if higher layer parameter sl-MultiReserveResource is configured; 0 bit
otherwise.
   DMRS pattern - $\lceil \log_2 N_{pattern} \rceil$ bits as defined in clause 8.4.1.1.2 of [4, TS 38.211], where
$N_{pattern}$ is the number of DMRS patterns configured by higher layer parameter sl-PSSCH-DMRS-
TimePatternList.
     $2^{nd}$-stage SCI format - 2 bits as defined in Table 8.3.1.1-1.
     Beta_offset indicator - 2 bits as provided by higher layer parameter sl-BetaOffsets 2ndSCI
and Table 8.3.1.1-2.
      Number of DMRS port - 1 bit as defined in Table 8.3.1.1-3.
      Modulation and coding scheme - 5 bits as defined in clause 8.1.3 of [6, TS 38.214].
      Additional MCS table indicator - as defined in clause 8.1.3.1 of [6, TS 38.214]: 1 bit if one
MCS table is configured by higher layer parameter sl-Additional-MCS-Table; 2 bits if two MCS
tables are configured by higher layer parameter sl-Additional-MCS-Table; 0 bit otherwise.

TABLE 6-continued

3GPP TS 38.212

PSFCH overhead indication - 1 bit as defined clause 8.1.3.2 of [6, TS 38.214] if higher layer parameter sl-PSFCH-Period = 2 or 4; 0 bit otherwise.
Reserved - a number of bits as determined by higher layer parameter sl-NumReservedBits, with value set to zero.

Table 8.3.1.1-1: 2$^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

Table 8.3.1.1-2: Mapping of Beta_offset indicator values to indexes in Table 9.3-2 of [5, TS38.213]

| Value of Beta_offset indicator | Beta_offset index in Table 9.3-2 of [5, TS38.213] |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

Table 8.3.1.1-3: Number of DMRS port(s)

| Value of the Number of DMRS port field | Antenna ports |
|---|---|
| 0 | 1000 |
| 1 | 1000 and 1001 |

Table 7 shows an example of a 2nd-stage SCI format.

TABLE 7

3GPP TS 38.212

8.4.1.1 SCI format 2-A
SCI format 2-A is used for the decoding of PSSCH, with HARQ operation when HARQ-ACK information includes ACK or NACK, when HARQ-ACK information includes only NACK, or when there is no feedback of HARQ-ACK information.
The following information is transmitted by means of the SCI format 2-A:
- HARQ process number - 4 bits as defined in clause 16.4 of [5, TS 38.213].
- New data indicator - 1 bit as defined in clause 16.4 of [5, TS 38.213].
- Redundancy version - 2 bits as defined in clause 16.4 of [6, TS 38.214].
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Cast type indicator - 2 bits as defined, in Table 8.4.1.1-1.
- CSI request - 1 bit as defined in clause 8.2.1 of [6, TS 38.214].

Table 8.4.1.1-1: Cast type indicator

| Value of Cast type indicator | Cast type |
|---|---|
| 00 | Broadcast |
| 01 | Groupcast when HARQ-ACK information includes ACK or NACK |

TABLE 7-continued

3GPP TS 38.212

| | |
|---|---|
| 10 | Unicast |
| 11 | Groupcast when HARQ-ACK information includes only NACK |

8.4.1.2 SCI format 2-B
SCI format 2-B is used for the decoding of PSSCH, with HARQ operation when HARQ-ACK information includes only NACK, or when there is no feedback of HARQ-ACK information.
The following information is transmitted by means of the SCI format 2-B:
- HARQ process number - 4 bits as defined in clause 16.4 of [5, TS 38.213].
- New data indicator - 1 bit as defined in clause 16.4 of [5, TS 38.213].
- Redundancy version - 2 bits as defined in clause 16.4 of [6, TS 38.214].
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Zone ID - 12 bits as defined in clause 5.8.11 of [9, TS 38.331].
- Communication range requirement - 4 bits determined by higher layer parameter sl-ZoneConfigMCR-Index.

Referring to (a) or (b) of FIG. 6, in step S630, the first UE may receive the PSFCH based on Table 8. For example, the first UE and the second UE may determine a PSFCH resource based on Table 8, and the second UE may transmit HARQ feedback to the first UE using the PSFCH resource.

TABLE 8

3GPP TS 38.213

16.3 UE procedure for reporting HARQ-ACK on sidelink
A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.
A UE can be provided, by sl-PSFCH-Period-r16, a number of slots in a resource pool for a period of PSFCH transmission occasion resources. If the number is zero, PSFCH transmissions from the UE in the resource pool are disabled.
A UE expects that a slot $t'^{SL}_k$ ($0 \le k < T'_{max}$) has a PSFCH transmission occasion resource if k mod $N_{PSSCH}^{PSFCH} = 0$, where $t'^{SL}_k$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period-r16.
A UE may be indicated by higher layers to not transmit a PSFCH in response to a PSSCH reception [11, TS 38.321].
If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.
A UE is provided by sl-PSFCH-RB-Set-r 16 a set of $M_{PRB, set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $[(i + j \cdot N_{PSSCH}^{PSFCH}) \cdot M_{subch, slot}^{PSFCH}, (i + 1 + j \cdot N_{PSSCH}^{PSFCH}) \cdot M_{subch, slot}^{PSFCH} - 1]$ PRBs from the $M_{PRB, set}^{PSFCH}$ PRBs to slot i among the PSSCH slots associated with the PSFCH slot and sub-channel j, where $M_{subch, slot}^{PSFCH} = M_{PRB, set}^{PSFCH}/N_{subch} \cdot N_{PSSCH}^{PSFCH}$, $0 \le i < N_{PSSCH}^{PSFCH}$, $0 \le j < N_{subch}$, and the allocation starts in an ascending order of i and continues in an ascending order of j. The UE expects that $M_{PRB, set}^{PSFCH}$ is a multiple of $N_{subch} \cdot N_{PSSCH}^{PSFCH}$.
A UE determines a number of PSFCH resources available for multiplexing HARQ-ACK information in a PSFCH transmission as $R_{PRB, CS}^{PSFCH} = N_{type}^{PSFCH} \cdot M_{subch, slot}^{PSFCH} \cdot N_{CS}^{PSFCH}$ where $N_{CS}^{PSFCH}$ is a number of cyclic shift pairs for the resource pool and, based on an indication by higher layers,
- $N_{type}^{PSFCH} = 1$ and the $M_{subch, slot}^{PSFCH}$ PRBs are associated with the starting sub-channel of the corresponding PSSCH
- $N_{type}^{PSFCH} = N_{subch}^{PSSCH}$ and the $N_{subch}^{PSSCH} \cdot M_{subch, slot}^{PSFCH}$ PRBs are associated with one or more sub-channels from the $N_{subch}^{PSSCH}$ sub-channels of the corresponding PSSCH
The PSFCH resources are first indexed according to an ascending order of the PRB index, from the $N_{type}^{PSFCH} \cdot M_{subch, slot}^{PSFCH}$ PRBs, and then according to an ascending order of the cyclic shift pair index from the $N_{CS}^{PSFCH}$ cyclic shift pairs.
A UE determines an index of a PSFCH resource for a PSFCH transmission in response to a PSSCH reception as $(P_{ID} + M_{ID}) \bmod R_{PRB, CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

TABLE 8-continued

3GPP TS 38.213

A UE determines a $m_0$ value, for computing a value of cyclic shift α [4, TS 38.211], from a cyclic shift pair index corresponding to a PSFCH resource index and from $N_{CS}^{PSFCH}$ using Table 16.3-1.

Table 16.3-1: Set of cyclic shift pairs

| $N_{CS}^{PSFCH}$ | $m_0$ | | | | | |
|---|---|---|---|---|---|---|
| | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{CS}$ value, for computing a value of cyclic shift α [4, TS 38.211], as in Table 16.3-2 if the UE detects a SCI format 2-A with Cast type indicator field value of "01" or "10", or as in Table 16.3-3 if the UE detects a SCI format 2-B or a SCI format 2-A with Cast type indicator field value of "11". The UE applies one cyclic shift from a cyclic shift pair to a sequence used for the PSFCH transmission [4, TS 38.211].

Table 16.3-2: Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

Table 16.3-3: Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

Referring to (a) of FIG. 6, in step S640, the first UE may transmit SL HARQ feedback to the base station through the PUCCH and/or the PUSCH based on Table 9.

TABLE 9

3GPP TS 38.213

16.5 UE procedure for reporting HARQ-ACK on uplink
A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in Clause 9, of the cell where the UE monitors PDCCH for detection of DCI format 3_0.
For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources.
For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.
For each PSFCH reception occasion, from a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable
- if the UE receives a PSFCH associated with a SCI format 2-A with Cast type indicator field value of "10"
  - generate HARQ-ACK information with same value as a value of HARQ-ACK information the UE determines from a PSFCH reception in the PSFCH reception occasion and, if the UE determines that a PSFCH is not received at the PSFCH reception occasion, generate NACK
- if the UE receives a PSFCH associated with a SCI format 2-A with Cast type indicator field value of "01"
  - generate ACK if the UE determines ACK from at least one PSFCH reception occasion, from the number of PSFCH reception occasions, in PSFCH resources corresponding to every identity $M_{ID}$ of the UEs that the UE expects to receive the PSSCH, as described in Clause 16.3; otherwise, generate NACK
- if the UE receives a PSFCH associated with a SCI format 2-B or a SCI format 2-A with TABLE 9-continued

3GPP TS 38.213

Cast type indicator field value of "11"
- generate ACK when the UE determines absence of PSFCH reception for each
PSFCH reception occasion from the number of PSFCH reception occasions:
otherwise, generate NACK
After a UE transmits PSSCHs and receives PSFCHs in corresponding PSFCH resource
occasions, the priority value of HARQ-ACK information is same as the priority value of the
PSSCH transmissions that is associated with the PSFCH reception occasions providing the
HARQ-ACK information.
The UE generates a NACK when, due to prioritization, as described in Clause 16.2.4, the UE
does not receive PSFCH in any PSFCH reception occasion associated with a PSSCH
transmission in a resource provided by a DCI format 3_0 with CRC scrambled by a SL-RNTI
or, for a configured grant, in a resource provided in a single period and for which the UE is
provided a PUCCH resource to report HARQ-ACK information. The priority value of the
NACK is same as the priority value of the PSSCH transmission.
The UE generates a NACK when, due to prioritization as described in Clause 16.2.4, the UE
does not transmit a PSSCH in any of the resources provided by a DCI format 3_0 with CRC
scrambled by SL-RNTI or, for a configured grant, in any of the resources provided in a single
period and for which the UE is provided a PUCCH resource to report HARQ-ACK information.
The priority value of the NACK is same as the priority value of the PSSCH that was not
transmitted due to prioritization.
The UE generates an ACK if the UE does not transmit a PSCCH with a SCI format 1-A
scheduling a PSSCH in any of the resources provided by a configured grant in a single period
and for which the UE is provided a PUCCH resource to report HARQ-ACK information. The
priority value of the ACK is same as the largest priority value among the possible priority
values for the configured grant.
A UE does not expect to be provided PUCCH resources or PUSCH resources to report
HARQ-ACK information that start earlier than $(N + 1) \cdot (2048 + 144) \cdot \kappa \cdot 2^\mu \cdot T_c$ after the end
of a last symbol of a last PSFCH reception occasion, from a number of PSFCH reception
occasions that the UE generates HARQ-ACK information to report in a PUCCH or PUSCH
transmission, where
- $\kappa$ and $T_c$ are defined in [4, TS 38.211]
- $\mu = \min(\mu_{SL}, \mu_{UL})$, where $\mu_{SL}$ is the SCS configuration of the SL BWP and $\mu_{UL}$ is the SCS
configuration of the active UL BWP on the primary cell
- N is determined from $\mu$ according to Table 16.5-1

Table 16.5-1: Values of N

| $\mu$ | N |
|---|---|
| 0 | 14 |
| 1 | 18 |
| 2 | 28 |
| 3 | 32 |

With reference to slots for PUCCH transmissions and for a number of PSFCH reception
occasions ending in slot n, the UE provides the generated HARQ-ACK information in a
PUCCH transmission within slot n + k, subject to the overlapping conditions in Clause 9.2.5,
where k is a number of slots indicated by a PSFCH-to-HARQ_feedback timing indicator
field, if present, in a DCI format indicating a slot for PUCCH transmission to report the HARQ-
ACK information, or k is provided by sl-PSFCH-ToPUCCH-CG-Type1-r16. k = 0
corresponds to a last slot for a PUCCH transmission that would overlap with the last PSFCH
reception occasion assuming that the start of the sidelink frame is same as the start of the
downlink frame [4, TS 38.211].
For a PSSCH transmission by a UE that is scheduled by a DCI format, or for a SL configured
grant Type 2 PSSCH transmission activated by a DCI format, the DCI format indicates to the
UE that a PUCCH resource is not provided when a value of the PUCCH resource indicator
field is zero and a value of PSFCH-to-HARQ feedback timing indicator field, if present, is
zero. For a SL configured grant Type 1 PSSCH transmission, a PUCCH resource can be
provided by sl-N1PUCCH-AN-r16 and sl-PSFCH-ToPUCCH-CG-Type1-r16. If a PUCCH
resource is not provided, the UE does not transmit a PUCCH with generated HARQ-ACK
information from PSFCH reception occasions.
For a PUCCH transmission with HARQ-ACK information, a UE determines a PUCCH resource
after determining a set of PUCCH resources for $O_{UCI}$ HARQ-ACK information bits, as
described in Clause 9.2.1. The PUCCH resource determination is based on a PUCCH resource
indicator field [5, TS 38.212] in a last DCI format 3_0, among the DCI formats 3_0 that have
a value of a PSFCH-to-HARQ_feedback timing indicator field indicating a same slot for the
PUCCH transmission, that the UE detects and for which the UE transmits corresponding
HARQ-ACK information in the PUCCH where, for PUCCH resource determination, detected
DCI formats are indexed in an ascending order across PDCCH monitoring occasion indexes.
A UE does not expect to multiplex HARQ-ACK information for more than one SL configured
grants in a same PUCCH.
A priority value of a PUCCH transmission with one or more sidelink HARQ-ACK information
bits is the smallest priority value for the one or more HARQ-ACK information bits.
In the following, the CRC for DCI format 3_0 is scrambled with a SL-RNTI or a SL-CS-RNTI.

Sidelink Control Information (SCI)

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a 1st SCI, and an SCI including a second SCI configuration field group may be referred to as a second SCI or a 2nd SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

In various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE through the PSSCH, the PSSCH may be replaced/substituted with the second SCI.

Figure 7:
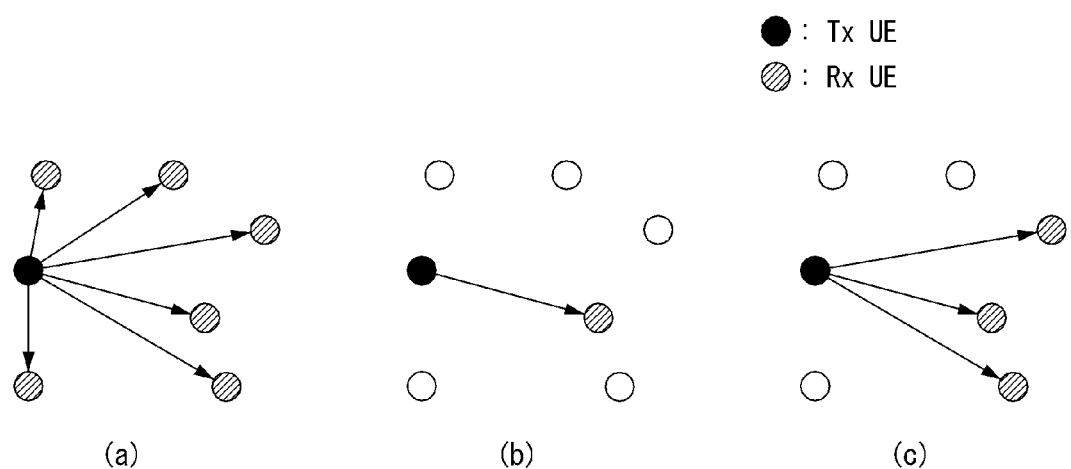
FIG. 7 shows three cast type based on an embodiment of the present disclosure.

FIG. 7 shows three cast types based on an embodiment of the present disclosure.

Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, an RRC connection establishment between UEs will be described.

For V2X or SL communication, a transmitting UE may need to establish a (PC5) RRC connection with a receiving UE. For example, the UE may obtain V2X-specific SIB. For a UE which is configured to transmit V2X or SL communication by a higher layer and which has data to be transmitted, if a frequency at which at least the UE is configured to transmit SL communication is included in the V2X-specific SIB, the UE may establish an RRC connection with another UE without including a transmission resource pool for the frequency. For example, if an RRC connection is established between the transmitting UE and the receiving UE, the transmitting UE may perform unicast communication with respect to the receiving UE through the established RRC connection.

When the RRC connection is established between the UEs, the transmitting UE may transmit an RRC message to the receiving UE.

The receiving UE may perform antenna/resource de-mapping, demodulation, and decoding for received information. The information may be transferred to the RRC layer via the MAC layer, the RLC layer, and the PDCP layer. Accordingly, the receiving UE may receive the RRC message generated by the transmitting UE.

V2X or SL communication may be supported for a UE of an RRC_CONNECTED mode, a UE of an RRC_IDLE mode, and a UE of an (NR) RRC_INACTIVE mode. That is, the UE of the RRC_CONNECTED mode, the UE of the RRC_IDLE mode, and the UE of the (NR) RRC_INACTIVE mode may perform V2X or SL communication. The UE of the RRC_INACTIVE mode or the UE of the RRC_IDLE mode may perform V2X or SL communication by using a cell-specific configuration included in V2X-specific SIB.

RRC may be used to exchange at least UE capability and AS layer configuration. For example, a UE 1 may transmit UE capability and AS layer configuration of the UE 1 to a UE 2, and the UE 1 may receive UE capability and AS layer configuration of the UE 2 from the UE 2. In case of UE capability transfer, an information flow may be triggered during or after PC5-S signaling for a direct link setup.

Measurement and Reporting for SL

Hereinafter, SL measurement and reporting will be described.

For the purpose of QoS prediction, initial transmission parameter setting, link adaptation, link management, admission control, or the like, SL measurement and reporting (e.g., RSRP, RSRQ) between UEs may be considered in SL. For example, a receiving UE may receive a reference signal from a transmitting UE, and the receiving UE may measure a channel state for the transmitting UE based on the reference signal. In addition, the receiving UE may report channel state information (CSI) to the transmitting UE. SL-related measurement and reporting may include measurement and reporting of CBR and reporting of location information. Examples of channel status information (CSI) for V2X may include a channel quality indicator (CQI), a precoding matrix index (PM), a rank indicator (RI), reference signal received power (RSRP), reference signal received quality (RSRQ), pathgain/pathloss, a sounding reference symbol (SRS) resource indicator (SRI), a SRI-RS resource indicator (CRI), an interference condition, a vehicle motion, or the like. In case of unicast communication, CQI, RI, and PMI or some of them may be supported in a non-subband-based aperiodic CSI report under the assumption of four or less antenna ports. A CSI procedure may not be dependent on a standalone reference signal (RS). A CSI report may be activated or deactivated based on a configuration.

For example, the transmitting UE may transmit CSI-RS to the receiving UE, and the receiving UE may measure CQI or RI based on the CSI-RS. For example, the CSI-RS may be referred to as SL CSI-RS. For example, the CSI-RS may be confined within PSSCH transmission. For example, the transmitting UE may perform transmission to the receiving UE by including the CSI-RS on the PSSCH.

Hybrid Automatic Repeat Request (HARQ) for SL

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure, HARQ-ACK may be referred to as ACK, ACK information, or positive-ACK information, and HARQ-NACK may be referred to as NACK, NACK information, or negative-ACK information.

Bandwidth Part and Resource Pool

Hereinafter, a bandwidth part (BWP) and a resource pool will be described.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 8:
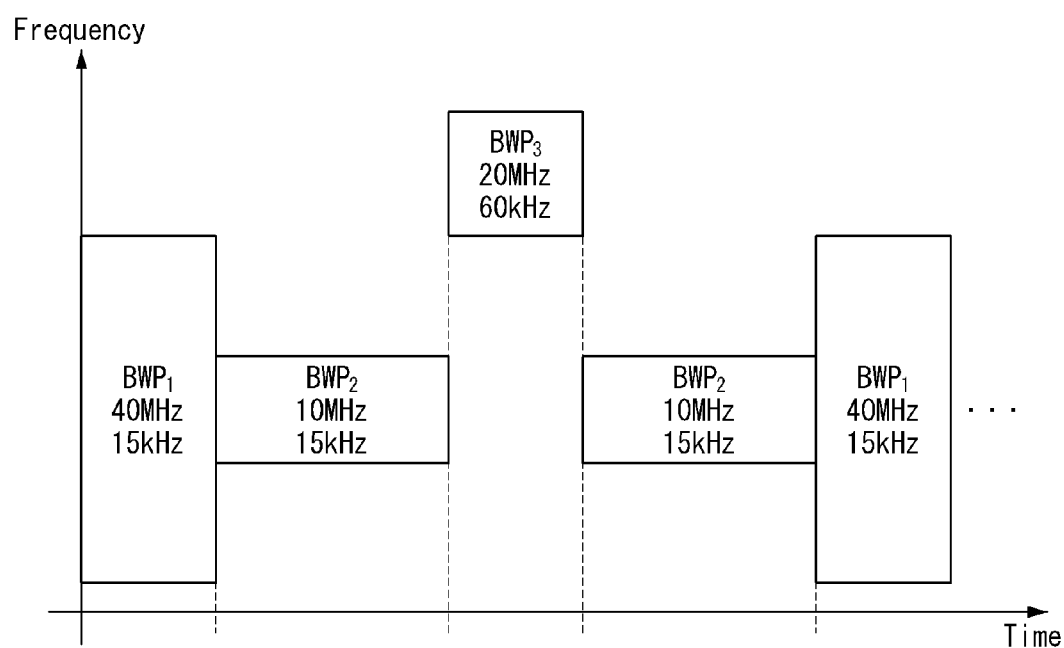
FIG. 8 shows a plurality of BWPs based on an embodiment of the present disclosure.

FIG. 8 shows a plurality of BWPs based on an embodiment of the present disclosure.

Referring to FIG. 8, a BWP1 having a bandwidth of 40 MHz and a subcarrier spacing of 15 kHz, a BWP2 having a bandwidth of 10 MHz and a subcarrier spacing of 15 kHz, and a BWP3 having a bandwidth of 20 MHz and a subcarrier spacing of 60 kHz may be configured.

Figure 9:
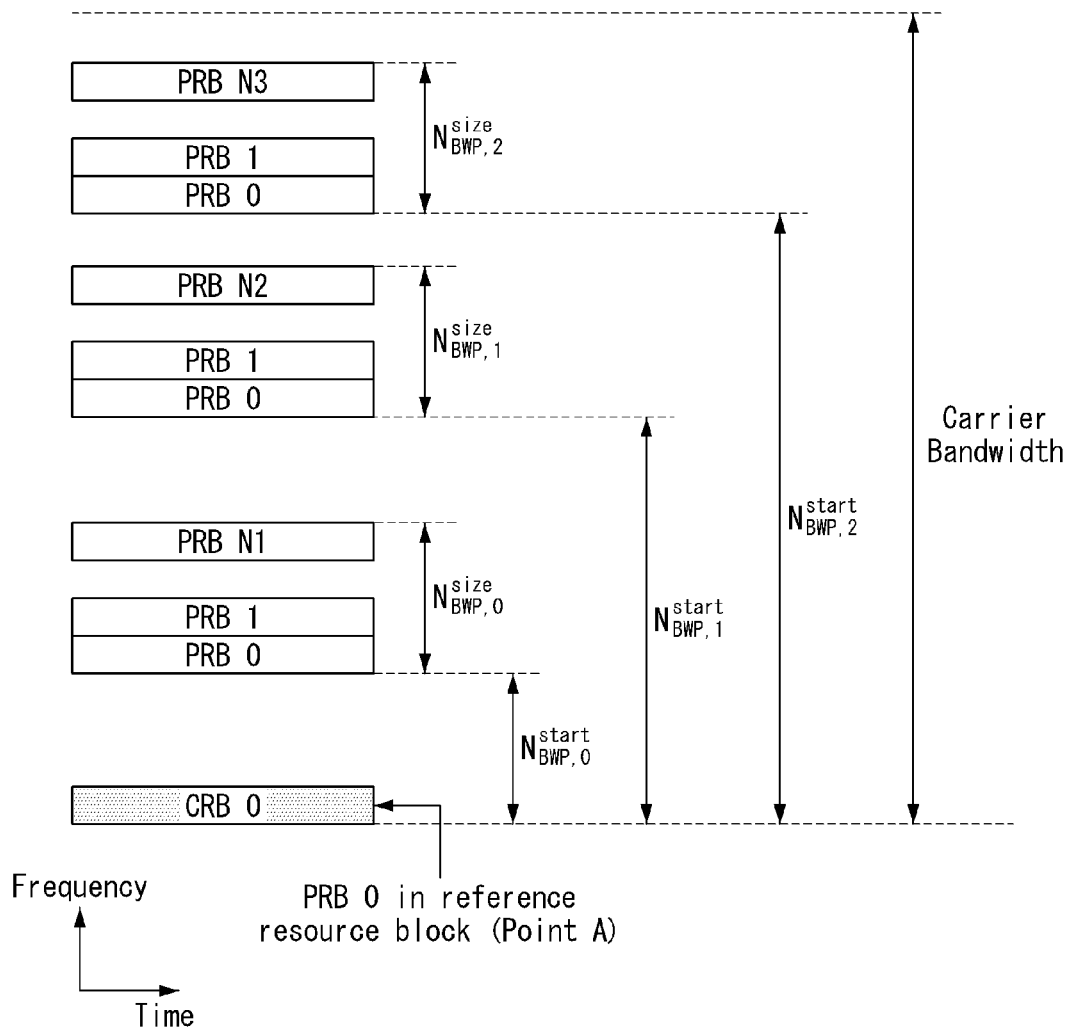
FIG. 9 shows a BWP based on an embodiment of the present disclosure.

FIG. 9 shows a BWP based on an embodiment of the present disclosure. It is assumed in the embodiment of FIG. 9 that the number of BWPs is 3.

Referring to FIG. 9, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

The BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

A resource pool may be a group of time-frequency resources that may be used for SL transmission and/or SL reception. From a perspective of the UE, time-domain resources in the resource pool may not be consecutive. A plurality of resource pools may be (pre-)configured to the UE in one carrier. From a perspective of a physical layer, the UE may perform unicast, groupcast, and broadcast communication by using the configured or pre-configured resource pool.

Sidelink (SL) Congestion Control

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 10:
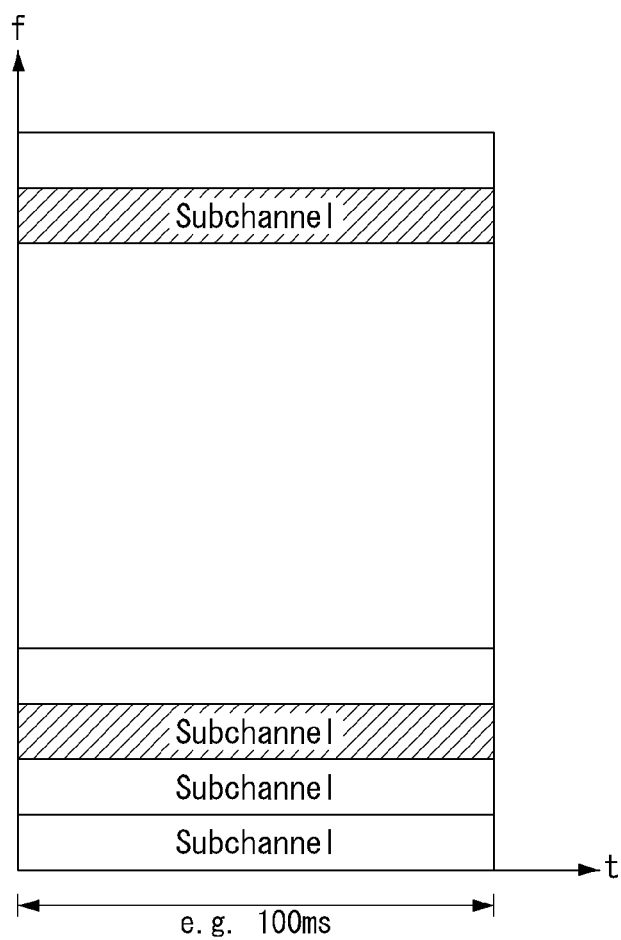
FIG. 10 shows a resource unit for CBR measurement based on an embodiment of the present disclosure.

FIG. 10 shows a resource unit for CBR measurement based on an embodiment of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Figure 11:
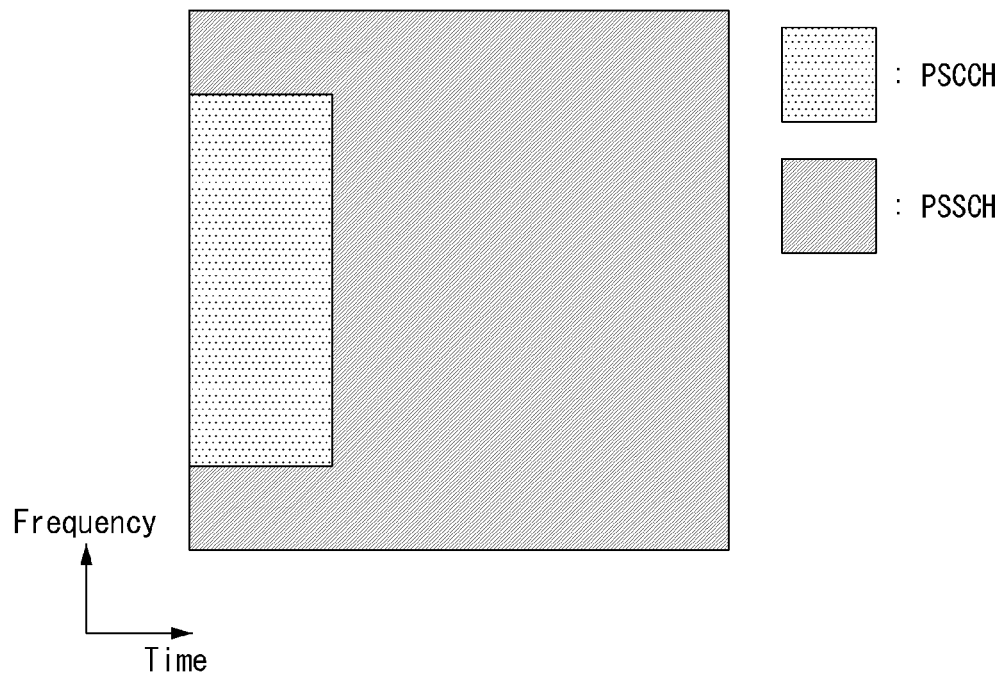
FIG. 11 illustrates a resource pool related to CBR measurement.

FIG. 11 illustrates a resource pool related to CBR measurement.

For example, as shown in the embodiment of FIG. 11, if a PSCCH and a PSSCH are multiplexed, the UE may perform one CBR measurement for one resource pool. Herein, if a PSFCH resource is configured or pre-configured, the PSFCH resource may be excluded in the CBR measurement.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Table 10 shows an example of SL CBR and SL RSSI.

TABLE 10

| | SL CBR |
|---|---|
| Definition | SL Channel Busy Ratio (SL CBR) measured in slot n is defined as the portion of sub-channels in the resource pool whose SL RSSI measured by the UE exceed a (pre-)configured threshold sensed over a CBR measurement window [n − a, n − 1], wherein a is equal to 100 or 100 · $2^\mu$ slots, according to higher layer parameter timeWindowSize-CBR. |
| Applicable for | RRC_IDLE intra-frequency,<br>RRC_IDLE inter-frequency,<br>RRC_CONNECTED intra-frequency,<br>RRC_CONNECTED inter-frequency |
| | SL RSSI |
| Definition | Sidelink Received Signal Strength Indicator (SL RSSI) is defined as the linear average of the total received power (in [W]) observed in the configured sub-channel in OFDM symbols of a slot configured for PSCCH and PSSCH, starting from the $2^{nd}$ OFDM symbol.<br>For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. |
| Applicable for | RRC_IDLE intra-frequency,<br>RRC_IDLE inter-frequency,<br>RRC_CONNECTED intra-frequency,<br>RRC_CONNECTED inter-frequency |

Referring to Table 10, the slot index may be based on a physical slot index.

Table 11 shows an example of SL CR (Channel Occupancy Ratio).

TABLE 11

| Definition | Sidelink Channel Occupancy Ratio (SL CR) evaluated at slot n is defined as the total number of sub-channels used for its transmissions in slots [n − a, n − 1] and granted in slots [n, n + b] divided by the total number of configured sub-channels in the transmission pool over [n − a, n + b]. |
|---|---|
| Applicable for | RRC_IDLE intra-frequency,<br>RRC_IDLE Inter-frequency,<br>RRC_CONNECTED intra-frequency,<br>RRC_CONNECTED inter-frequency |

NOTE 1:
a is a positive integer and b is 0 or a positive integer; a and b are determined by UE implementation with a + b + 1 = 1000 or 1000 · $2^\mu$ slots, according to higher layer parameter time WindowSize-CR, b < (a + b + 1)/2, and nib shall not exceed the last transmission opportunity of the grant for the current transmission.
NOTE 2:
SL CR is evaluated for each (re)transmission.
NOTE 3:
In evaluating SL CR, the UE shall assume the transmission parameter used at slot n is reused according to the existing grant(s) in slot [n + 1, n + b] without packet dropping.
NOTE 4:
The slot index is based on physical slot index.
NOTE 5:
SL CR can be computed per priority level
NOTE 6:
A resource is considered granted if it is a member of a selected sidelink grant as defined in TS 38.321 [7].

Discontinuous Reception (DRX) Operation

The UE may perform the DRX operation while performing the procedures and/or methods described/proposed above. The UE configured with DRX may reduce power consumption by discontinuously receiving a DL signal. The DRX may be performed in Radio Resource Control (RRC) IDLE state, RRC_INACTIVE state, and RRC_CONNECTED state.

RRC_CONNECTED DRX

In RRC_CONNECTED state, DRX is used for discontinuous reception of PDCCH. For convenience, DRX performed in the RRC_CONNECTED state is referred to as RRC_CONNECTED DRX.

Figure 12:
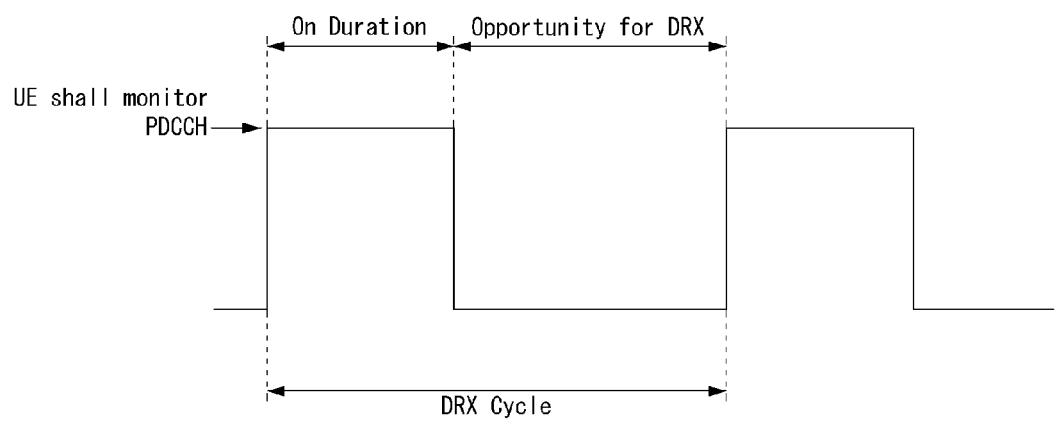
FIG. 12 illustrates a DRX cycle to which a method proposed in the present disclosure can be applied.

FIG. 12 illustrates a DRX cycle to which a method proposed in the present disclosure can be applied.

Referring to FIG. 12, a DRX cycle consists of On Duration and Opportunity for DRX. The DRX cycle defines a time interval at which On Duration is periodically repeated. The On Duration indicates a duration that the UE monitors to receive the PDCCH. When the DRX is configured, the UE performs PDCCH monitoring during On Duration. If there is a successfully detected PDCCH during PDCCH monitoring, the UE operates an inactivity timer and maintains an awake state. On the other hand, if there is no PDCCH successfully detected during PDCCH monitoring, the UE enters a sleep state after the On Duration ends.

Therefore, when the DRX is configured, PDCCH monitoring/reception may be performed discontinuously in the time domain in performing the procedure and/or method described/proposed above.

For example, when the DRX is configured, PDCCH monitoring in the present disclosure may be performed discontinuously based on DRX configuration in activated cell(s). Specifically, PDCCH monitoring may be performed when the PDCCH occasion (e.g. a duration configured to monitor PDCCH (e.g. one or more consecutive OFDM symbols)) corresponds to On Duration, and PDCCH monitoring may be omitted when corresponding to Opportunity for DRX. On the other hand, when DRX is not configured, PDCCH monitoring/reception may be continuously performed in the time domain in performing the procedure and/or method described/proposed above.

For example, when DRX is not configured, PDCCH reception occasion may be continuously configured in the present disclosure. Meanwhile, PDCCH monitoring may be limited in a duration configured as a measurement gap regardless of whether DRX is configured.

Table 12 below shows a procedure of the UE related to DRX (RRC_CONNECTED state). Referring to Table 12, DRX configuration information is received through higher layer (e.g. RRC) signaling, and whether to turn DRX ON/OFF is controlled by the DRX command of the MAC layer. When DRX is configured, as illustrated in FIG. 12, the UE may discontinuously perform PDCCH monitoring in performing the procedure and/or method described/proposed in the present disclosure.

TABLE 12

| | Type of signals | UE procedure |
|---|---|---|
| $1^{st}$ step | RRC signalling ( MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

Here, MAC-CellGroupConfig includes configuration information required to configure medium access control (MAC) parameters for a cell group. MAC-CellGroupConfig may also include DRX-related configuration information. For example, MAC-CellGroupConfig may include information for defining DRX as follows.

Value of drx-OnDurationTimer: Defines the length of the time period of the DRX cycle Value of drx-InactivityTimer: Defines the length of the duration in which the UE remains awake after a PDCCH occasion in which a PDCCH indicating initial UL or DL data is detected Value of drx-HARQ-RTT-TimerDL: Defines the length of the maximum duration until a DL retransmission is received after the DL initial transmission is received.

Value of drx-HARQ-RTT-TimerUL: Defines the length of the maximum duration until a grant for UL retransmission is received after a grant for UL initial transmission is received.

drx-LongCycleStartOffset: Defines the time length and start point of the DRX cycle drx-ShortCycle (optional): Defines the time length of the short DRX cycle Here, if either drx-OnDurationTimer or drx-InactivityTimer is running, the UE performs PDCCH monitoring at every PDCCH occasion while maintaining an awake state.

RRC_IDLE DRX

In RRC_IDLE state and RRC_INACTIVE state, DRX is used for discontinuous reception of paging signals. For convenience, DRX performed in the RRC_IDLE (or RRC_INACTIVE) state is referred to as RRC_IDLE DRX.

Therefore, when DRX is configured, monitoring/reception of a paging signal (or paging message) may be discontinuously performed in the time domain in performing the procedure and/or method described/proposed above.

DRX may be configured for discontinuous reception of paging signals. The UE may receive DRX configuration information from the base station through higher layer (e.g. RRC) signaling. The DRX configuration information may include configuration information on a DRX cycle, a DRX offset, and a DRX timer. The UE repeats the On Duration and Sleep duration based on the DRX cycle. The UE may operate in a wakeup mode in the On duration and in a sleep mode in the Sleep duration. In the wakeup mode, the UE may monitor the PO to receive the paging message. The PO means a time resource/duration (e.g. subframe, slot) in which the UE expects to receive the paging message. PO monitoring includes monitoring PDCCH (or MPDCCH, NPDCCH) (hereinafter referred to as paging PDCCH) scrambled with P-RNTI in PO. The paging message may be included in the paging PDCCH or a PDSCH scheduled by the paging PDCCH. One or a plurality of PO(s) may be included in a Paging Frame (PF), and the PF may be periodically configured based on the UE ID. Here, the PF may correspond to one wireless frame, and the UE ID may be determined based on the UE's International Mobile Subscriber Identity (IMSI). When DRX is configured, the UE monitors only one PO per DRX cycle. When the UE receives a paging message indicating a change of its ID and/or system information from the PO, the UE may perform a RACH process to initialize (or reconfigure) a connection with the base station, or receive (or obtain) new system information from the base station. Therefore, in performing the procedure and/or method described/proposed above, the PO monitoring may be performed discontinuously in the time domain to perform RACH for connection with the base station, or receive (or obtain) new system information from the base station.

The following Table 13 illustrates configuration/operation related to DRX.

TABLE 13

3GPP TS 38.321 V16.2.1

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

TABLE 13-continued

3GPP TS 38.321 V16.2.1

NOTE 1: If Sidelink resource allocation mode 1 is configured by RRC, a DRX functionality is not configured.

RRC controls DRX operation by configuring the following parameters:
- drx-onDurationTimer: the duration at the beginning of a DRX cycle;
- drx-SlotOffset: the delay before starting the drx-onDurationTimer;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-LongCycleStartOffset: the Long DRX cycle and drx-StartOffset which defines the subframe where the Long and Short DRX cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity;
- ps-Wakeup (optional): the configuration to start associated drx-onDurationTimer in case DCP is monitored but not detected;
- ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;
- ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

When a DRX cycle is configured, the Active Time for Serving Cells in a DRX group includes the time while:
- drx-onDurationTimer or drx-InactivityTimer configured for the DRX group is running; or
- drx-RetransmissionTimerDL or drx-RetransmissionTimerUL is running on any Serving Cell in the DRX group; or
- ra-ContentionResolutionTimer (as described in clause 5.1.5) or msgB-ResponseWindow (as described in clause 5.1.4a) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:
1> if a MAC PDU is received in a configured downlink assignment:
    2> start the drx-HARQ-RTT-TimerDL for the corresponding HARQ process in the first symbol after the end of the corresponding transmission carrying the DL HARQ feedback;
    2> stop the drx-RetransmissionTimerDL for the corresponding HARQ process.
1> if a MAC PDU is transmitted in a configured uplink grant and LBT failure indication is not received from lower layers:
    2> start the drx-HARQ-RTT-TimerUL for the corresponding HARQ process in the first symbol after the end of the first repetition of the corresponding PUSCH transmission;
    2> stop the drx-RetransmissionTimerUL for the corresponding HARQ process.
1> if a drx-HARQ-RTT-TimerDL expires:
    2> if the data of the corresponding HARQ process was not successfully decoded:
        3> start the drx-RetransmissionTimerDL for the corresponding HARQ process in the first symbol after the expiry of drx-HARQ-RTT-TimerDL.
1> if a drx-HARQ-RTT-TimerUL expires:
    2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
    2> stop drx-onDurationTimer for each DRX group;
    2> stop drx-InactivityTimer for each DRX group.
1> if drx-InactivityTimer for a DRX group expires:
    2> if the Short DRX cycle is configured:
        3> start or restart drx-ShortCycleTimer for this DRX group in the first symbol after the expiry of drx-InactivityTimer;
        3> use the Short DRX cycle for this DRX group.
    2> else:
        3> use the Long DRX cycle for this DRX group.

TABLE 13-continued

3GPP TS 38.321 V16.2.1

1> if a DRX Command MAC CE is received:
  2> if the Short DRX cycle is configured:
    3> start or restart drx-ShortCycleTimer for each DRX group in the first symbol after the end of DRX Command MAC CE reception;
    3> use the Short DRX cycle for each DRX group.
  2> else:
    3> use the Long DRX cycle for each DRX group.
1> if drx-ShortCycleTimer for a DRX group expires:
  2> use the Long DRX cycle for this DRX group.
1> if a Long DRX Command MAC CE is received:
  2> stop drx-ShortCycleTimer for each DRX group;
  2> use the Long DRX cycle for each DRX group.
1> if the Short DRX cycle is used for a DRX group, and [(SFN × 10) + subframe number] modulo (drx-ShortCycle) = (drx-StartOffset) modulo (drx-ShortCycle):
  2> start drx-onDurationTimer for this DRX group after drx-SlotOffset from the beginning of the subframe.
1> if the Long DRX cycle is used for a DRX group, and [(SFN × 10) + subframe number] modulo (drx-LongCycle) = drx-StartOffset:
  2> if DCP monitoring is configured for the active DL BWP as specified in TS 38.213 [6], clause 10.3:
    3> if DCP indication associated with the current DRX cycle received from lower layer indicated to start drx-onDurationTimer, as specified in TS 38.213 [6]; or
    3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap, or when the MAC entity monitors for a PDCCH transmission on the search space indicated by recoverySearchSpaceId of the SpCell identified by the C-RNTI while the ra-ResponseWindow is running (as specified in clause 5.1.4); or
    3> if ps-Wakeup is configured with value true and DCP indication associated with the current DRX cycle has not been received from lower layers:
      4> start drx-onDurationTimer after drx-SlotOffset from the beginning of the subframe.
  2> else:
    3> start drx-onDurationTimer for this DRX group after drx-SlotOffset from the beginning of the subframe.
NOTE 2: In case of unaligned SFN across carriers in a cell group, the SFN of the SpCell is used to calculate the DRX duration.
1> if a DRX group is in Active Time:
  2> monitor the PDCCH on the Serving Cells in this DRX group as specified in TS 38.213 [6];
  2> if the PDCCH indicates a DL transmission:
    3> start the drx-HARQ-RTT-TimerDL for the corresponding HARQ process in the first symbol after the end of the corresponding transmission carrying the DL HARQ feedback;
NOTE 3: When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.
    3> stop the drx-RetransmissionTimer DL for the corresponding HARQ process.
    3> if the PDSCH-to-HARQ_feedback timing indicate a non-numerical k1 value as specified in TS 38.213 [6]:
      4> start the drx-RetransmissionTimerDL in the first symbol after the PDSCH transmission for the corresponding HARQ process.
  2> if the PDCCH indicates a UL transmission:
    3> start the drx-HARQ-RTT-TimerUL for the corresponding HARQ process in the first symbol after the end of the first repetition of the corresponding PUSCH transmission;
    3> stop the drx-RetransmissionTimerUL for the corresponding HARQ process.
  2> if the PDCCH indicates a new transmission (DL or UL) on a Serving Cell in this DRX group:
    3> start or restart drx-InactivityTimer for this DRX group in the first symbol after the end of the PDCCH reception.
  2> if a HARQ process receives downlink feedback information and acknowledgement is indicated:
    3> stop the drx-RetransmissionTimerUL for the corresponding HARQ process.
1> if DCP monitoring is configured for the active DL BWP as specified in TS 38.213 [6], clause 10.3; and
1> if the current symbol n occurs within drx-onDurationTimer duration; and
1> if drx-onDurationTimer associated with the current DRX cycle is not started as specified in this clause:
  2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
    3> not transmit periodic SRS and semi-persistent SRS defined in TS 38.214 [7];
    3> not report semi-persistent CSI configured on PUSCH;
    3> if ps-TransmitPeriodicL1-RSRP is not configured with value true:
      4> not report periodic CSI that is L1-RSRP on PUCCH.

TABLE 13-continued

3GPP TS 38.321 V16.2.1

```
       3>  if ps-TransmitOtherPeriodicCSI is not configured with value true:
           4>  not report periodic CSI that is not L1-RSRP on PUCCH.
  1>  else:
       2>  in current symbol n, if a DRX group would not be in Active Time considering
           grants/assignments scheduled on Serving Cell(s) in this DRX group and DRX Command
           MAC CE/Long DRX Command MAC CE received and Scheduling Request sent until 4 ms
           prior to symbol n when evaluating all DRX Active Time conditions as specified in this
           clause:
           3>  not transmit periodic SRS and semi-persistent SRS defined in TS 38.214 [7] in this DRX
               group;
           3>  not report CSI on PUCCH and semi-persistent CSI configured on PUSCH in this DRX
               group.
       2>  if CSI masking (csi-Mask) is setup by upper layers:
           3>
               in current symbol n, if drx-onDurationTimer of a DRX group would not be running
               considering grants/assignments scheduled on Serving Cell(s) in this DRX group and
               DRX Command MAC CE/Long DRX Command MAC CE received until 4 ms prior to
               symbol n when evaluating all DRX Active Time conditions as specified in this clause;
               and
               4>  not report CSI on PUCCH in this DRX group.
NOTE 4:        If a UE multiplexes a CSI configured on PUCCH with other overlapping UCI(s)
               according to the procedure specified in TS 38.213 [6] clause 9.2.5 and this CSI
               multiplexed with other UCI(s) would be reported on a PUCCH resource outside DRX
               Active Time of the DRX group in which this PUCCH is configured, it is up to UE
               implementation whether to report this CSI multiplexed with other UCI(s).
Regardless of whether the MAC entity is monitoring PDCCH or not on the Serving Cells in a DRX
group, the MAC entity transmits HARQ feedback, aperiodic CSI on PUSCH, and aperiodic SRS
defined in TS 38.214 [7] on the Serving Cells in the DRX group when such is expected.
The MAC entity needs not to monitor the PDCCH if it is not a complete PDCCH occasion (e.g. the
Active Time starts or ends in the middle of a PDCCH occasion).
```

A method/operation (i.e. an operation related to DRX) according to an embodiment described below may be performed in combination with a pre-defined DRX operation/method or may be performed based on the pre-defined DRX operation/method. For example, at least one of the existing DRX operation, the SL DRX operation, and/or the existing DRX operation combined with and performed together with the SL DRX operation may be performed based on the above-described Discontinuous Reception (DRX) operation, Table 12 and Table 13. For example, an operation/configuration that is not separately defined or newly defined in the SL DRX operation described later may be based on the above-described Discontinuous Reception (DRX) operation and Tables 12 and 13. That is, the above-described Discontinuous Reception (DRX) operation and operation/configuration based on Tables 12 and 13 may be applied as the SL DRX operation/configuration.

In the present disclosure, a wording "configuration or definition" may be interpreted as being (pre-)configured from the base station or the network (via pre-defined signaling (e.g., SIB, MAC signaling, or RRC signaling). For example, "A may be configured" may include "the base station or network (pre-)configures/defines or announces A for the UE". Alternatively, the wording "configuration or definition" may be interpreted as being pre-configured or defined by a system. For example, "A may be configured" may include "A is pre-configured/defined by the system".

Meanwhile, Sidelink DRX operation is newly supported in Release 17 NR Sidelink operation. The embodiment (s) of the present disclosure proposes a Sidelink DRX Command MAC CE operating method. In the following description, 'when, if', in case of may be replaced with 'based on'.

The UE (MAC entity), based on the sidelink grant, may determine i) a set of PSCCH duration(s) in which transmission of SCI occurs and ii) a set of PSSCH duration(s) in which transmission of SL-SCH related to the SCI occurs.

The sidelink grant may be i) dynamically received on the PDCCH (dynamic sidelink grant), ii) semi-persistently configured by RRC (configured sidelink grant), or iii) autonomously selected by the UE (MAC entity) (selected sidelink grant). The dynamic sidelink grant and the configured sidelink grant are related to resource allocation mode 1 ((a) in FIG. 6), and the selected sidelink grant is related to resource allocation mode 2 ((b) in FIG. 6).

Hereinafter, random selection based resource allocation mode 2 will be described in detail.

When a transmitting UE (MAC Entity) receives a random selection based transmission indication from a higher layer, it randomly selects time and frequency resources from a resource pool for a transmission opportunity of a resource pool (e.g. sidelink exceptional pool). The transmitting UE transmits SL data using randomly selected time and frequency resources.

Sidelink DRX Operation & Resource Selection

The Rx UE operating based on the SL DRX configuration monitors the PSCCH/PSSCH (e.g. first stage SCI and second stage SCI) of the Tx UE in the DRX active time (e.g., SL DRX Onduration Timer, SL DRX Inactivity Timer, SL DRX Retransmission Timer) period. The Rx UE can successfully receive the PSCCH/PSSCH (SCI & SL Data) of the Tx UE only when the Tx UE selects a resource in the DRX active time period of the Rx UE and transmits SCI (e.g. first stage SCI and second stage SCI) and SL data.

When the MAC entity of the Tx UE selects a transmission resource using the sensing based mode 2 resource selection method (using sidelink normal resource pool), it delivers/indicates the SL DRX active time information (time period information of the DRX active time by the timer (e.g., SL DRX onduration timer, SL DRX Inactivity Timer, SL DRX Retransmission Timer) related to the SL DRX active time in which currently running in the Rx UE) of the Rx UE to the physical layer of the Tx UE when resource (re)selection is triggered. The physical layer selects "a set of candidate resources" among the resources (Tx normal resource pool) within the DRX Active time of the Rx UE based on the SL DRX Active time information of the Rx UE delivered from the MAC Layer and informs the MAC Layer when the Tx UE uses a sensing based resource selection operation. The MAC layer selects a resource from among resources (e.g. "a set of candidate resources") indicated from the Physical layer within the DRX active times indicated in the Physical layer and transmits SL Data to the Rx UE under SL DRX operation based on the selected resource.

For example, when a random selection based resource selection operation (e.g. using a sidelink exceptional resource pool) is used, the physical layer does not inform the MAC layer of "a set of candidate resources". When the random selection based resource selection operation is used, since the Tx UE randomly selects a resource from the sidelink exceptional pool without considering the DRX active time of the Rx UE, a randomly selected resource may be a resource that is not included in the SL DRX active time of the Rx UE. Therefore, if the Tx UE transmits SL data through the corresponding resource to the Rx UE, since the RX UE may be operating in sleep mode, a problem of not receiving SL data transmitted by the Tx UE may occur.

For example, the Tx UE may select a resource in consideration of the SL DRX active time of the Rx UE. The Tx UE determines the SL DRX active time based on the SL DRX timer which is running or the SL DRX timer scheduled to run of the Rx UE. The Tx UE may select a resource in the determined SL DRX active time. In the case of the SL DRX timer (SL DRX inactivity timer) scheduled to operate, it is assumed that SCI is normally received, if the receiving UE fails to receive the SCI, the SL DRX inactivity timer does not operate. In this case, the resource selected by the Tx UE based on the SL DRX timer (SL DRX inactivity timer) scheduled to operate may not be included in the SL DRX active time of the Rx UE.

The receiving UE (Rx UE) may refer to a UE (UE receiving SL-SCH Data) receiving sidelink data based on an SL DRX operation, and the transmitting UE (Tx UE) may refer to a UE (UE transmitting SL-SCH Data) transmitting sidelink data to a corresponding receiving UE in consideration of the SL DRX operation of the receiving UE. For example, the receiving UE (UE receiving SL-SCH Data) may operate based on the following Table 14, and the transmitting UE (UE transmitting SL-SCH Data) may operate based on the following Table 15.

TABLE 14

5.28.2 Behaviour of UE receiving SL-SCH Data

When SL DRX is configured, the Active Time includes the time while:
- sl-drx-onDurationTimer/sl-DRX-GC-BC-OndurationTimer or sl-drx-InactivityTimer/sl-DRX-GC-InactivityTimer is running; or
- sl-drx-RetransmissionTimer/sl-DRX-GC-RetransmissionTimer is running; or
- period of sl-LatencyBoundCSI-Report configured by RRC in case SL-CSI reporting MAC CE is not received; or
- the time between the transmission of the request of SL-CSI reporting and the reception of the SL-CSI reporting MAC CE in case SL-CSI reporting MAC CE is received; or
  Slot(s) associated with the announced periodic transmission(s) by the UE transmitting SL-SCH Data; or
- the time between transmission/reception of Direct Link Establishment Request message (TS 24.587 [28]) or ProSe Direct Link Establishment Request message (TS 24.554 [29]) and reception of RRCReconfigurationSidelink message including initial DRX configuration or the link establishment procedure being aborted by upper layer; or
- the time between transmission of RRCReconfigurationSidelink message including initial DRX configuration and reception of corresponding RRCReconfigurationCompleteSidelink or RRCReconfigurationFailureSidelink message.

When one or multiple SL DRX is configured, the MAC entity shall:
1> if a single sl-DRX-GC-BC-Cycle that is mapped with one or multiple SL-QoS-Profile is configured to a Destination and interested cast type is associated to groupcast or broadcast:
   2> select the sl-DRX-GC-BC-Cycle that is mapped with one or multiple SL-QoS-Profile associated with the Destination:
   2> select the sl-DRX-GC-BC-OndurationTimer that is mapped with one or multiple SL-QoS-Profile associated with the Destination.
1> else if multiple sl-DRX-GC-BC-Cycle that are mapped with multiple SL-QoS-Profile are associated to a Destination Layer-2 ID and interested cast type is associated to groupcast or broadcast:
   2> select the sl-DRX-GC-BC-Cycle whose length is the shortest one among multiple sl-DRX-GC-BC-Cycle that are mapped with multiple SL-QoS-Profile associated with the Destination Layer-2 ID:
   2> select the sl-DRX-GC-BC-OndurationTimer whose length is the longest one among multiple sl-DRX-GC-BC-OndurationTimer that are mapped with multiple SL-QoS-Profile associated with the Destination Layer-2 ID.
1> if a single sl-DRX-GC-InactivityTimer that is mapped with one or multiple SL-QOS-Profile is configured to a Destination and interested cast type is associated to groupcast:
   2> select the sl-DRX-GC-InactivityTimer that is mapped with one or multiple SL-QOS-Profile associated with the Destination:
1> else if multiple sl-DRX-GC-InactivityTimer that are mapped with multiple SL-QOS-Profile of a Destination Layer-2 ID and interested cast type is associated to groupcast:
   2> select sl-DRX-GC-InactivityTimer whose length is the longest one among multiple sl-DRX-GC-InactivityTimer that are mapped with multiple SL-QoS-Profile associated with the Destination Layer-2 ID.

TABLE 14-continued 5.28.2 Behaviour of UE receiving SL-SCH Data

1> if an sl-drx-HARQ-RTT-Timer/sl-drx-HARQ-RTT-Timer1/sl-drx-HARQ-RTT-Timer2 expires:
  2> if the data of the corresponding Sidelink process was not successfully decoded or if the HARQ feedback (i.e., negative acknowledgement) is not transmitted for unicast due to UL/SL prioritization:
    3> start the sl-drx-RetransmissionTimer/sl-DRX-GC-RetransmissionTimer for the corresponding Sidelink process in the first slot after the expiry of sl-drx-HARQ-RTT-Timer1 or sl-drx-HARQ-RTT-Timer2.

When the cast type is groupcast or broadcast as indicated by upper layer, the sl-drx-StartOffset and sl-drx-SlotOffset are derived from the following equations:
sl-drx-StartOffset (ms) = Destination Layer-2 ID modulo sl-DRX-GC-BC-Cycle (ms).
sl-drx-SlotOffset (ms) = Destination Layer-2 ID modulo the number of slots in one subframe (ms).

1> if the SL DRX cycle is used, and [(DFN × 10) + subframe number] modulo (sl-drx-Cycle or sl-DRX-GC-BC-Cycle) = sl-drx-StartOffset:
  2> start sl-drx-onDurationTimer/sl-DRX-GC-BC-OndurationTimer after sl-drx-SlotOffset from the beginning of the subframe.
1> if an SL DRX is in Active Time:
  2> monitor the SCI (i.e., $1^{st}$ stage SCI and $2^{nd}$ stage SCI) in this SL DRX.
  2> if the SCI indicates a new SL transmission:
    3> if Source Layer-1 ID of the SCI is equal to the 8 LSB of the intended Destination Layer-2 ID and Destination Layer-1 ID of the SCI is equal to the 16 LSB of the intended Source Layer-2 ID and the cast type indicator in the SCI is set to unicast:
      4> start or restart sl-drx-InactivityTimer for the corresponding Source Layer-2 ID and Destination Layer-2 ID pair in the first slot after SCI reception.
    3> if Destination Layer-1 ID of the SCI (i.e., $2^{nd}$ stage SCI) is equal to the 16 LSB of the intended Destination Layer-1 ID and the cast type indicator in the SCI is set to groupcast:
      4> start or restart sl-drx-InactivityTimer for the corresponding Destination Layer-2 ID in the first slot after SCI reception.
  2> if the SCI indicates an SL transmission:
    3> if a next retransmission opportunity is indicated in the SCI:
      4> derive the sl-drx-HARQ-RTT-Timer from the retransmission resource
    3> else if PSFCH resource is configured for the SL grant associated to the SCI:
      4> set the sl-drx-HARQ-RTT-Timer based on sl-drx-HARQ-RTT-Timer1 configured by upper layer when HARQ feedback is enabled, or based on sl-drx-HARQ-RTT-Timer2 configured by upper layer when HARQ feedback is disabled, for resource pool configured with PSFCH.
    3> else (i.e., if PSFCH resource is not configured for the SL grant associated to the SCI):
      4> set the sl-drx-HARQ-RTT-Timer as 0 slots.
    3> if PSFCH resource is not configured for the SL grant associated to the SCI:
      4> start the sl-drx-HARQ-RTT-Timer2 for the corresponding Sidelink process in the slot following the end of PSSCH transmission (i.e., currently received PSSCH).
    3> if PSFCH resource is configured for the SL grant associated to the SCI:
      4> if HARQ feedback is enabled by the SCI and the cast type indicator in the SCI is set to unicast; or
      4> if HARQ feedback is enabled by the SCI and the cast type indicator in the SCI is set to groupcast and positive-negative acknowledgement is selected;
        5> start the sl-drx-HARQ-RTT-Timer1 for the corresponding Sidelink process in the first slot after the end of the corresponding PSFCH transmission carrying the SL HARQ feedback; or
        5> start the sl-drx-HARQ-RTT-Timer1 for the corresponding Sidelink process in the first slot after the end of the corresponding PSFCH resource for the SL HARQ feedback when the SL HARQ feedback is not transmitted due to UL/SL prioritization;
      4> if HARQ feedback is enabled by the SCI and the cast type indicator in the SCI is set to groupcast and negative-only acknowledgement is selected;
        5> start the sl-drx-HARQ-RTT-Timer1 for the corresponding Sidelink process in the first slot after the end of the corresponding PSFCH transmission carrying the SL HARQ feedback; or
        5> start the sl-drx-HARQ-RTT-Timer1 for the corresponding Sidelink process in the first slot after the end of the corresponding PSFCH resource for the SL HARQ feedback when the SL HARQ feedback is not transmitted due to UL/SL prioritization; or
        5> start the sl-drx-HARQ-RTT-Timer1 for the corresponding Sidelink process in the first slot after the end of the corresponding PSFCH resource for the SL HARQ feedback when the SL HARQ feedback is a positive acknowledgement.
      4> if HARQ feedback is disabled by the SCI and the resource(s) for one or more retransmission opportunities is not scheduled in the SCI:
        5> start the sl-drx-HARQ-RTT-Timer2 for the corresponding Sidelink process in the slot following the end of PSFCH resource.

TABLE 14-continued 5.28.2 Behaviour of UE receiving SL-SCH Data

```
           4>  if HARQ feedback is disabled by the SCI and the resource(s) for one or
               more retransmission opportunities is scheduled in the SCI:
               5>  start the sl-drx-HARQ-RTT-Timer2 for the corresponding Sidelink
                   process in the slot following the end of PSSCH transmission (i.e.,
                   currently received PSSCH).
NOTE:         Void.
           3>  stop the sl-drx-RetransmissionTimer/sl-DRX-GC-RetransmissionTimer for
               the corresponding Sidelink process.
   1>  if the SCI indicates a new transmission where the cast type is set to groupcast is
       transmitted:
       2>  start or restart sl-DRX-GC-InactivityTimer for the corresponding Destination
           Layer-2 ID in the first slot after SCI transmission.
   1>  if an SL DRX Command MAC CE is received for the Source Layer-2 ID and
       Destination Layer-2 ID pair of a unicast:
       2>  stop sl-drx-onDurationTimer for the Source Layer-2 ID and Destination
           Layer-2 ID pair of a unicast;
       2>  stop sl-drx-InactivityTimer for the Source Layer-2 ID and Destination Layer-
           2 ID pair of a unicast.
```

TABLE 15

5.28.3 Behaviour of UE transmitting SL-SCH Data

```
The UE transmitting SL-SCH Data should keep aligned with its intended UE receiving
the SL-SCH Data regarding the SL DRX Active time as specified in clause 5.28.2.
Furthermore, the UE transmitting SL-SCH Data determines the SL DRX Active time
based on SL DRX timers that are running (e.g., sl-drx-onDurationTimer, sl-drx-
InactivityTimer, sl-drx-RetransmissionTimer) or will be running in the future (e.g., sl-
drx-onDurationTimer, sl-drx-InactivityTimer, sl-drx-RetransmissionTimer) at the
UE(s) receiving SL-SCH data. The UE may select resource for the initial transmission
of groupcast within the time when sl-drx-onDurationTimer or sl-drx-InactivityTimer
of the destination is running.
   NOTE 1:    A UE may assume that a resource for retransmission is in the Active
              time if an initial transmission causes the sl-drx-RetransmissionTimer to be
              started at the receiving UE.
   NOTE 2:    A UE may send SL DRX Command MAC CE to receiving UE for
              unicast and when to send SL DRX Command MAC CE is up to UE
              implementation.
The MAC entity shall for each pair of the Source Layer-2 ID and the Destination Layer-
2 ID corresponding to each PC5-RRC connection which has been established by upper
layers:
   1>         if the SL DRX Command indication has been triggered by the UE:
              2>  if the MAC entity has SL resources allocated for new transmission and the
                  SL-SCH resources can accommodate the SL DRX Command MAC CE and
                  its subheader as a result of logical channel prioritization:
                  3>  instruct the Multiplexing and Assembly procedure to generate a Sidelink
                      DRX Command MAC CE as defined in clause 6.1.3.52;
                  3>  cancel the triggered SL DRX Command indication.
              2>  else if the MAC entity has been configured with Sidelink resource allocation
                  mode 1:
                  3>  trigger a Scheduling Request.
```

As described above, not only when the Tx UE does not consider the SL DRX active time of the Rx UE but also when the Tx UE considers the SL DRX active time of the Rx UE, the resource selected by the Tx UE may not be included in the SL DRX active time.

Hereinafter, embodiments applicable to an SL DRX operation of the Rx UE and a resource selection operation of the Tx UE will be described in detail. For convenience of description, the resource selection operation will be described based on random selection of resource allocation mode 2, but embodiments described below may be applied even when a resource is selected based on a method (sensing) other than the random selection.

Proposal 1

It may be assumed that the transmitting UE transmits SL Data using resources of resource allocation mode 2 based on random selection. If the resource selected based on random selection is a resource that is not included in the SL DRX active time of the receiving UE, the transmitting UE discards the selected resource (e.g. sidelink grant related to resource allocation mode 2) and re-triggers the resource selection process. For example, the fact that the selected resource is not included in the SL DRX active time of the receiving UE may mean that resources for transmission of first stage SCI and second stage SCI are not in the SL DRX active time of the receiving UE. In other words, the fact that the selected resource is not included in the SL DRX active time of the receiving UE may mean that PSCCH duration(s) and second stage SCI are not in the SL DRX active time of the receiving UE. Specifically, when the PSCCH duration(s) and second stage SCI for all transmissions of the MAC PDU of the sidelink grant (e.g. selected sidelink grant) created based on resource allocation mode 2 is not in the SL DRX active time of the receiving UE, the transmitting UE may clear the selected sidelink grant and trigger Tx resource (re) selection.

According to an embodiment, a resource reselection process may reach a threshold value because a resource selected based on random selection based resource allocation mode 2 is not included in the SL DRX active time of the receiving UE. At this time, the UE may declare Sidelink RLF (Radio Link Failure).

According to an embodiment, when the resource reselection process reaches a threshold value because a resource selected based on random selection based resource allocation mode 2 is not included in the SL DRX active time of the receiving UE (or when the resource selected based on random selection based resource allocation mode 2 is a resource that is not included in the SL DRX active time of the receiving UE), the transmitting UE may indicate the receiving UE to stop the SL DRX operation and operate in active mode. For example, the indication of the active mode operation may be performed based on at least one of PC5 RRC message, SL DRX MAC CE, or SCI. The receiving UE receiving an indication to stop the SL DRX operation from the transmitting UE may report the SL DRX stop to its serving base station (e.g. serving cell). Reporting of the SL DRX stop may be performed based on an RRC message. The RRC message may include at least one of i) SidelinkUEInformation message, ii) UEAssistanceInformation message, or iii) RRC message different from the RRC messages listed above.

According to an embodiment, when the transmitting UE transmits SL Data using a resource of random selection based resource allocation mode 2, and the selected resource is a resource that is not included in the SL DRX active time of the receiving UE (or when the resource reselection process reaches a threshold value because the resource selected based on random selection based resource allocation mode 2 is not included in the SL DRX active time of the receiving UE), the transmitting UE may request the base station to change the configuration from resource allocation mode 2 to resource allocation mode 1. For example, the request for changing the resource allocation mode may be performed based on an RRC message. The RRC message may include at least one of i) SidelinkUEInformation message, ii) UEAssistanceInformation message, or iii) RRC message different from the RRC messages listed above.

Proposal 2

When the MAC entity of the Tx UE selects a transmission resource using the random selection based resource allocation mode 2 method (e.g. using sidelink exceptional resource pool), it may transmit SL DRX active time information of the Rx UE to the physical layer of the Tx UE when resource (re)selection is triggered. The SL DRX active time information may indicate an SL DRX active time by a currently operating SL DRX timer among timers related to the SL DRX active time of the Rx UE (e.g., SL DRX onduration timer, SL DRX Inactivity Timer, SL DRX Retransmission Timer). For example, the Tx UE (MAC entity) may randomly select time/frequency resources for one transmission opportunity from a resource pool occurring within the selected SL DRX active time of the Rx UE to indicate to the physical layer.

In addition, even when the Tx UE uses the random selection based resource allocation mode 2 method, the physical layer may select "a set of candidate resources" from among the resources within the DRX Active time of the Rx UE (sidelink exceptional resource pool) based on the SL DRX Active time information of the Rx UE delivered from the MAC layer and informs the MAC layer. The MAC layer may randomly select a resource from "a set of candidate resources" delivered from the physical layer and transmit SL Data to the Rx UE operating SL DRX based on the selected resource.

Proposal 3

A separate sidelink exceptional resource pool for SL DRX operation may be configured in the UE. The SL DRX specific exceptional (Tx) resource pool may be configured to be a sidelink resource pool always included in SL DRX active time. For example, the SL DRX specific exceptional (Tx) resource pool linked with SL DRX configuration (e.g., SL DRX onduration timer) for groupcast/broadcast (or unicast) may be configured in advance.

As another embodiment, in the case of sidelink unicast, after the transmitting UE and the receiving UE negotiate/configure the SL DRX configuration for unicast, the transmitting UE may select transmission resources using the random selection based resource allocation mode 2 method (e.g., using sidelink exceptional resource pool). Resources that can be randomly selected may be limited to resources of the sidelink exceptional resource pool included in the SL DRX active time of the SL DRX configuration (e.g., SL DRX onduration timer) for negotiated unicast. The transmitting UE may randomly select a transmission resource from among limited resources.

Proposal 4

When a transmitting UE transmits SL data using a resource of random selection based resource allocation mode 2, a randomly selected resource may be a resource that is not included in the SL DRX active time of the receiving UE when attempting to perform transmission using the randomly selected resource. In this case, the transmitting UE may determine the corresponding selected resource as unused transmission opportunities on resources indicated in the selected sidelink grant. Here, the selected sidelink grant refers to a sidelink grant created by a transmitting UE based on resource allocation mode 2.

For example, the transmitting UE may determine the selected resource as an unused transmission opportunity in the selected sidelink grant and trigger resource reselection. In other words, the selected sidelink grant is not used or ignored, and resource reselection may be triggered.

For example, if randomly selected resources are not included in the SL DRX active time of the receiving UE and "unused transmission opportunities" reach sl-ReselectAfter, the MAC entity of the transmitting UE may discard or clear the selected resources (selected sidelink grant associated to the Sidelink process) and trigger resource reselection.

Proposal 5

A transmitting UE may transmit SL Data using resources of random selection based resource allocation mode 2. At this time, when the transmitting UE attempts to perform transmission using a randomly selected resource, if the randomly selected resource is not included in the SL DRX active time of the receiving UE, SL_RESOURCE_RESELECTION_COUNTER may be decreased by 1.

In addition, the MAC entity of the transmitting UE continuously decreases SL_RESOURCE_RESELECTION_COUNTER by "1" and the value of SL_RESOURCE_RESELECTION_COUNTER reaches zero because the randomly selected resources are not included in the SL DRX active time of the receiving UE, it may discard or clear the selected resource (selected sidelink grant associated to the Sidelink process) and trigger resource reselection.

Proposal 6

When a higher layer (higher protocol than the MAC layer) configures to select a transmission resource using resources of random selection based resource allocation mode 2, the MAC Entity of the transmitting UE may indicate the receiving UE supporting SL DRX to stop the SL DRX operation and operate in active mode. For example, the indication of the active mode operation may be performed based on at least one of PC5 RRC message, SL DRX MAC CE, or SCI. The receiving UE receiving an indication to stop the SL DRX operation from the transmitting UE may report the SL DRX stop to its serving base station (e.g., serving cell). Reporting of the SL DRX stop may be performed based on the RRC message. The RRC message may include at least one of i) SidelinkUEInformation message, ii) UEAssistanceInformation message, or iii) RRC message different from the RRC messages listed above.

Proposal 7

In a higher layer (higher protocol than the MAC layer), a transmission UE may select a transmission resource based on random selection by configuring the selection of transmission resources using resources of the random selection based resource allocation mode 2. At this time, when the selected resource is a resource that is not included in the SL DRX Active time of the receiving UE, the transmitting UE may select the transmission resource of resource allocation mode 2 by changing to a sensing based selection method. Alternatively, when a higher layer (higher protocol than the MAC layer) is configured to select transmission resources using resources of random selection based resource allocation mode 2, and the receiving UE is a UE supporting SL DRX (or operating based on the SL DRX configuration), the transmitting UE may request the base station to change the configuration from the resource allocation mode 2 method to the resource allocation mode 1 method. For example, a request for changing the resource allocation mode (i.e., changing from resource allocation mode 2 to resource allocation mode 1) may be performed based on an RRC message. The RRC message may include at least one of i) SidelinkUEInformation message, ii) UEAssistanceInformation message, or iii) RRC message different from the RRC messages listed above.

Embodiments of the present disclosure have been described based on random selection of resource allocation mode 2, but the scope of application of the corresponding embodiment(s) (e.g., proposals 1 to 7) is not intended to be limited. That is, the above-described embodiment(s) may be applied when a resource is selected based on resource allocation mode 2. For example, the above-described embodiment(s) may be applied even when a resource is selected based on sensing (e.g., full sensing or partial sensing) in resource allocation mode 2.

The operation based on the above-described embodiment of the present disclosure may be applied to all sidelink unicast/groupcast/broadcast operations.

The above-described Sidelink DRX Configuration may include information on at least one or more of the following parameters.

Sidelink DRX Configurations

SL drx-onDurationTimer: the duration at the beginning of a SL DRX Cycle;

SL drx-SlotOffset: the delay before starting the sl drx-onDurationTimer;

SL drx-InactivityTimer: the duration after the PSCCH occasion in which a PSCCH indicates a new SL transmission for the MAC entity;

SL drx-StartOffset: the subframe where the SL DRX cycle start;

SL drx-Cycle: the SL DRX cycle;

SL drx-HARQ-RTT-Timer (per HARQ process or per sidelink process): the minimum duration before an assignment for HARQ retransmission is expected by the MAC entity.

SL drx-RetransmissionTimer (per HARQ process or per sidelink process): the maximum duration until a retransmission is received The UE may receive the Sidelink DRX Configuration from the base station through higher layer signaling (e.g., RRC signaling). For example, the Sidelink DRX Configuration may be received based on an RRC message (e.g., SL-DRX-Config). The Sidelink DRX Configuration may be defined/configured for each cast type related to sidelink communication (e.g., SL-DRX-Config-GC-BC, SL-DRX-ConfigUC). For example, the timer (e.g. onDurationTimer, InactivityTimer, HARQ-RTT-Timer, RetransmissionTimer) based on the above-described Sidelink DRX Configuration may include a timer for unicast and a timer for group cast (GC)/broadcast (BC).

The Uu DRX timer below may be used for the following purposes. Here, Uu DRX means existing DRX. That is, DRX previously supported may be referred to as Uu DRX, and DRX newly introduced for sidelink communication in Rel-17 may be referred to as SL DRX.

drx-HARQ-RTT-TimerSL Timer: Based on this Timer, a time period, in which the Tx UE (UE supporting Uu DRX operation) performing sidelink communication based on sidelink resource allocation mode 1 does not monitor the PDCCH (or DCI) for sidelink mode 1 resource allocation transmitted by the base station, is defined. That is, the time period in which the drx-HARQ-RTT-TimerSL Timer operates is an inactive time related to Uu DRX.

drx-RetransmissionTimerSL Timer: Based on this Timer, a time period, in which the Tx UE (UE supporting Uu DRX operation) performing sidelink communication based on sidelink resource allocation mode 1 monitors the PDCCH (or DCI) for sidelink mode 1 resource allocation transmitted by the base station, is defined. That is, the time period in which the drx-RetransmissionTimerSL Timer operates is an active time related to Uu DRX. This timer starts when DRX HARQ RTT Timer SL expires.

The Sidelink DRX timer based on the above-described Sidelink DRX Configuration may be used for the following purposes.

Sidelink DRX Onduration Timer: Based on this Timer, a time period, in which a UE performing Sidelink DRX operation should basically operate in Active Time to receive the PSCCH/PSSCH (first stage SCI/second stage SCI) of the other UE, is defined. That is, the time period in which the Sidelink DRX Onduration Timer is running is an active time related to SL DRX.

Sidelink DRX Inactivity Timer: Based on this Timer, the Sidelink DRX Onduration time period, which is a time period in which the UE performing Sidelink DRX operation should basically operate in Active Time to receive PSCCH/PSSCH (first stage SCI/second stage SCI) of the other UE, is extended. That is, the Sidelink DRX Onduration time period may be extended as much as the Sidelink DRX Inactivity Timer time period (i.e., the time period in which the Sidelink DRX Inactivity Timer operates). That is, the time period in which the Sidelink DRX Inactivity Timer operates is an active time related to SL DRX. In addition, the UE may start the Sidelink DRX Inactivity Timer and extend the Sidelink DRX Onduration timer when receiving a PSCCH (1st SCI and 2nd SCI) for a new TB or a new packet (new PSSCH transmission) from the other UE.

Sidelink DRX HARQ RTT Timer: Based on this Timer, a time period, in which the UE performing Sidelink DRX operation operates in Sleep mode until receiving a retransmission packet (or PSSCH assignment) transmitted by the other UE, is defined. That is, when the UE starts the Sidelink DRX HARQ RTT Timer, it may determine that the other UE will not transmit the sidelink retransmission packet to itself until the Sidelink DRX HARQ RTT Timer expires, and may operate in Sleep mode during the corresponding timer (while that timer is running) (or may not monitor the sidelink channel/signal transmitted by the Tx UE). That is, the time period in which the Sidelink DRX HARQ RTT Timer operates is an inactive time related to SL DRX.

Sidelink DRX Retransmission Timer: Based on this Timer, a time period in which a UE performing Sidelink DRX operation operates in Active Time to receive a retransmission packet (or PSSCH assignment) transmitted by the other UE is defined. That is, the time period in which the Sidelink DRX Retransmission Timer operates is an active time related to SL DRX. During the corresponding timer time period (while the corresponding timer is running), the UE monitors a retransmission sidelink packet (or PSSCH assignment) transmitted by the other UE. This Timer starts when Sidelink DRX HARQ RTT Timer expires.

In the present disclosure, the names of the timers (Uu DRX HARQ RTT TimerSL, Uu DRX Retransmission TimerSL, Sidelink DRX Onduration Timer, Sidelink DRX Inactivity Timer, Sidelink DRX HARQ RTT Timer, Sidelink DRX Retransmission Timer, etc.) are exemplary, and timers performing the same/similar functions based on the content described in each timer may be regarded as the same/similar timers regardless of their names.

In the present disclosure, the names of the timers (Sidelink DRX Onduration Timer, Sidelink DRX Inactivity Timer, Sidelink DRX HARQ RTT Timer, Sidelink DRX Retransmission Timer, etc.) are exemplary, and timers performing the same/similar functions based on the content described in each timer may be regarded as the same/similar timers regardless of their names.

The above-described embodiment(s) of the present disclosure may be applied and extended as a method of solving a problem of loss due to an interruption occurring during Uu Bandwidth Part (BWP) switching.

The above-described embodiment(s) of the present disclosure, when the UE supports Sidelink Multiple Bandwidth Part (BWP), may be applied and extended as a method of solving a problem of loss due to interruption occurring during Sidelink Bandwidth Part (BWP) switching.

The above-described embodiment (s) of the present disclosure may be applied to parameters (and timers) included in Default/Common Sidelink DRX configuration, Default/Common Sidelink DRX pattern, or Default/Common Sidelink DRX configuration. In addition, the above-described embodiment (s) of the present disclosure may be extended and applied to parameters (and timers) included in UE-Pair Specific Sidelink DRX configuration, UE-Pair Specific Sidelink DRX pattern, or UE-Pair Specific Sidelink DRX configuration.

In addition, definitions of terms related to the embodiments of the present disclosure may be interpreted/applied as follows.

The term Onduration may be interpreted/applied as a time period of Active Time (a time period operating in a wake up state (RF module is "On") to receive/transmit a wireless signal).

The term Offduration may be interpreted/applied as a time period of Sleep Time (a time period operating in a sleep mode state (RF module is "Off") for power saving). At this time, it does not mean that the Transmitting UE must operate in Sleep Mode compulsorily in the Sleep time period. If necessary, even in Sleep Time, the corresponding UE may operate in Active Time for a while for Sensing operation/Transmission operation.

The above-described embodiment(s) of the present disclosure may be performed/applied differently based on at least one of the following 1) to 7).
1) resource pool
2) Congestion Level,
3) Service Priority (and/or Type)
4) QoS requirements (e.g., Latency, Reliability) or PQI (PC5 Quality Indicator),
5) Traffic type (e.g., (non) periodic creation)
6) Sidelink transmission resource allocation mode (mode 1, mode 2)
7) Tx profile (e.g., Tx profile indicating that the service supports Sidelink DRX operation, Tx profile indicating that the service does not need to support Sidelink DRX operation)

For example, whether to perform the above-described SL DRX-related operation may be determined based on at least one of 1) to 7) above.

For example, application of the above-described SL DRX operation-related rule/parameter may be applied differently based on at least one of 1) to 7) above.

For example, an embodiment of the present disclosure (and/or a related parameter configuration value) may be configured to be applied based on satisfying conditions based on at least one of predefined elements. Specifically, the embodiments of the present disclosure may be configured to be applied based on satisfying conditions consisting of at least one of the elements listed below.

Activation/Deactivation of Uu Bandwidth Part, Activation/Deactivation of Sidelink Bandwidth Part, a resource pool (e.g., a resource pool with PSFCH configuration, a resource pool without PSFCH configuration), service/packet type (and/or priority), QoS profile or QoS requirements (e.g., URLLC/EMBB Traffic, Reliability, Latency), PQI, PC5 QoS Flow Identifier (PFI), Cast Type (e.g. Unicast, Groupcast, Broadcast), (resource pool) congestion level (e.g. CBR), SL HARQ feedback method (e.g., NACK Only Feedback, ACK/NACK Feedback), in case of transmission of HARQ Feedback Enabled MAC PDU (and/or HARQ Feedback Disabled MAC PDU), whether to configure PUCCH based SL HARQ feedback reporting operation, in the case of Pre-emption (and/or Re-Evaluation) (non) performance (or reselection of base resources), (L2 or L1) (Source and/or Destination) identifier, (L2 or L1) (combination of source layer ID and destination layer ID) identifier, (L2 or L1) (combination of a pair of Source layer ID and Destination layer ID and Cast type) identifier, direction of a pair of Source layer ID and Destination layer ID, PC5 RRC Connection/Link, in case of (non) performing SL DRX (or support), SL Mode type (resource allocation mode 1, resource allocation mode 2), in case of (non) periodic resource reservation, Tx profile (e.g. Tx profile indicating that the service supports Sidelink DRX operation, Tx profile indicating that the service does not need to support Sidelink DRX operation)

The (active time-related) "time period" mentioned in the proposal of the present disclosure may refer to 1) a time operating as Active Time as much as predefined time for UE to receive sidelink signals or sidelink data from the other UE or 2) a time operating as Active Time as much as the time of a specific timer (Sidelink DRX Retransmission Timer, Sidelink DRX Inactivity Timer, or a timer that guarantees that the DRX operation of the RX UE can operate in Active Time).

In addition, the embodiment of the present disclosure and whether or not the embodiment is applied (and/or related parameter configuration values) may also be applied to mmWave Sidelink operation.

Various embodiments of the present disclosure may be combined with each other.

From an implementation point of view, operations of the Tx UE/Rx UE (e.g., operations based on at least one of proposals 1 to 7) according to the above-described embodiments may be processed by the apparatus of FIGS. 15 to 20 (e.g., processors 102 and 202 of FIG. 16) to be described later.

Figure 16:
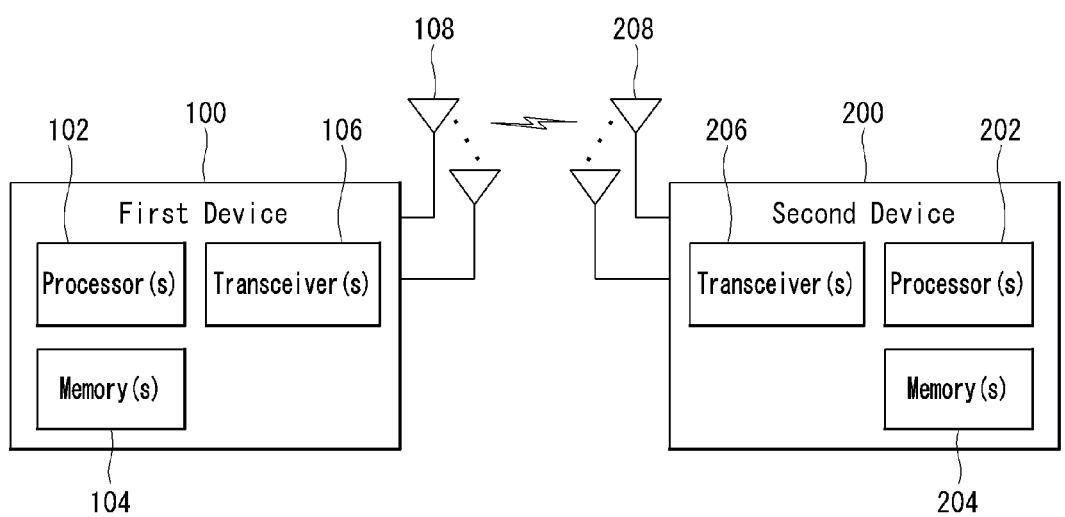
FIG. 16 shows wireless devices based on an embodiment of the present disclosure.

In addition, operations of the Rx UE/Tx UE (e.g., operations based on at least one of proposals 1 to 7) according to the above-described embodiment may be stored in a memory (e.g., 104 and 204 of FIG. 16) in the form of commands/programs (e.g. instruction, executable code) for driving at least one processor (e.g., 102 and 202 of FIG. 16).

Hereinafter, the above-described embodiments will be described in detail with reference to FIG. 13 in terms of operation of the first UE. The methods described below are only classified for convenience of description, and it goes without saying that some components of one method may be substituted with some components of another method, or may be applied in combination with each other, unless mutually excluded.

Figure 13:
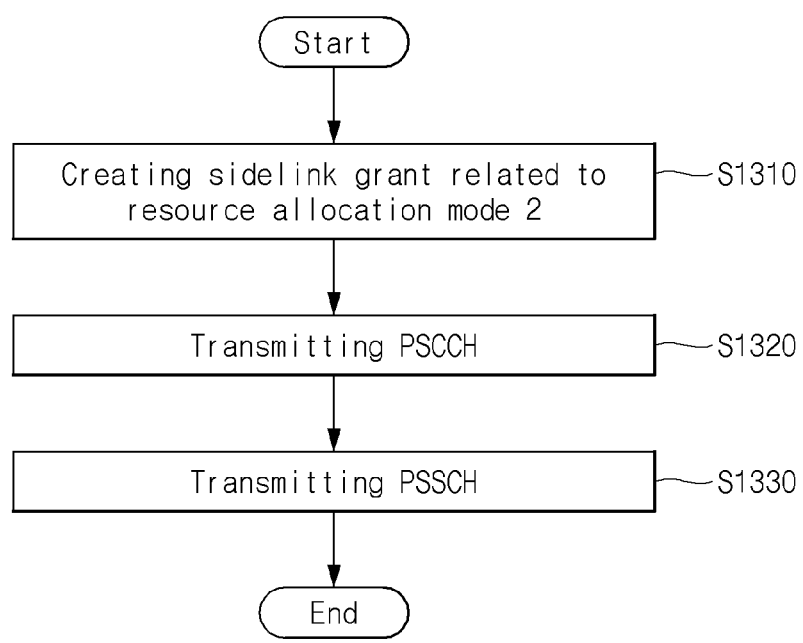
FIG. 13 is a flowchart for explaining a method for a first user equipment (UE) to perform sidelink communication in a wireless communication system according to an embodiment of the present disclosure.

FIG. 13 is a flowchart for explaining a method for a first user equipment (UE) to perform sidelink communication in a wireless communication system according to an embodiment of the present disclosure.

Referring to FIG. 13, a method for a first UE to perform sidelink communication in a wireless communication system according to an embodiment of the present disclosure includes creating a sidelink grant related to resource allocation mode 2 (S1310), transmitting a PSCCH (S1320), and transmitting a PSSCH (S1330).

In the following description, the first UE may mean the above-described SL DRX related Tx UE (e.g., first UE in FIG. 6 (*b*)), and the second UE may mean the above-described SL DRX related Rx UE (e.g., second UE in FIG. 6 (*b*)). In addition, the first UE may mean a UE transmitting sidelink data (UE transmitting SL-SCH Data in Table 15), and a second UE may mean a UE receiving sidelink data (UE receiving SL-SCH Data in Table 14).

In S1310, the first UE creates a sidelink grant related to resource allocation mode 2. The sidelink grant may mean the above-described selected sidelink grant.

Based on the sidelink grant, a set of at least one duration related to a Physical Sidelink Control Channel (PSCCH) and a set of at least one duration related to a Physical Sidelink Shared Channel (PSSCH) are determined. That is, the MAC entity of the first UE may determine a set of PSCCH duration(s) and a set of PSSCH duration(s) based on the sidelink grant. Transmission of SCI may occur in a set of PSSCH duration(s). Transmission of sidelink data (SL-SCH) related to the SCI may occur in the set of PSCCH duration(s).

Creation of the sidelink grant may correspond to the resource selection operation in FIG. 6 (*b*). For example, the set of PSCCH duration(s) and the set of PSSCH duration(s) determined based on the sidelink grant may be based on resources selected based on resource allocation mode 2.

The PSCCH and the PSSCH may be transmitted in a resource based on the resource allocation mode 2.

According to an embodiment, based on 1) the second UE behaving based on a SideLink Discontinuous Reception (SL DRX) configuration, and 2) the at least one duration related to the PSCCH and a second stage SCI related to the PSSCH, for transmission of a Medium Access Control Protocol Data Unit (MAC PDU) which is based on the sidelink grant, not being in a SL DRX active time of the second UE: a reselection of the resource based on the resource allocation mode 2 may be triggered. In other words, based on the PSCCH duration (s) and second stage SCI for transmission of the MAC PDU (e.g. all transmissions) based on the sidelink grant not being in the SL DRX active time of the receiving UE, reselection of resources based on the resource allocation mode 2 may be triggered.

At this time, the sidelink grant may be cleared. Specifically, after the sidelink grant is cleared, the reselection of resource based on the resource allocation mode 2 may be triggered.

The resource based on the resource allocation mode 2 may be a resource selected by a trigger for resource reselection as described above. The resource (re)selection method based on the resource allocation mode 2 may be configured as full sensing, partial sensing, or random selection. A resource selection method based on sensing (full sensing or partial sensing) is a method in which a resource is selected based on a sensing result performed on all or part of a sensing window. A resource selection method based on random selection is a method in which resources in a pre-configured resource pool are randomly selected.

According to an embodiment, the MAC PDU may be created based on selection of a logical channel related to the sidelink grant. The logical channel may be a logical channel to which a destination that is in the SL DRX active time belongs. The MAC PDU may be obtained from the sidelink grant. As described above, if the PSSCH duration (s) and the second stage SCI based on the sidelink grant are not in the SL DRX active time, the MAC PDU is not obtained. Specifically, based on the at least one duration related to the PSCCH for transmission of the Medium Access Control Protocol Data Unit (MAC PDU) which is based on the sidelink grant and the second stage SCI related to the PSSCH, not being in the SL DRX active time of the second UE, the MAC PDU is not obtained from the sidelink grant and the sidelink grant is not used. As described above, after the corresponding sidelink grant is cleared, the reselection of resource based on resource allocation mode 2 may be triggered.

According to an embodiment, the SL DRX active time may be determined based on the SL DRX timer. That is, the first UE (Tx UE) may determine the SL DRX active time based on the SL DRX timer of the second UE (Rx UE). This embodiment may be based on the operation of UE transmitting SL-SCH Data in Table 15. The SL DRX timer may include an SL DRX timer running in the second UE or an SL DRX timer to be run in the second UE. The SL DRX timer may include at least one of SL DRX onDurationTimer, SL DRX InactivityTimer, and SL DRX RetransmissionTimer.

According to an embodiment, based on the reselection of the resource based on the resource allocation mode 2 being triggered, an MAC entity of the first UE may indicate the SL DRX active time of the second UE to a physical layer of the first UE.

In the case of a random selection based method, a resource based on resource allocation mode 2 may be selected from a pre-configured resource pool. According to one embodiment, based on a resource selection mechanism related to the resource allocation mode 2 being random selection, a resource may be selected from a resource pool within the indicated SL DRX active time.

In the case of the sensing based resource selection method, a resource based on resource allocation mode 2 may be selected from among resources indicated by a physical layer of the first UE. According to an embodiment, based on the resource selection mechanism related to the resource allocation mode 2 being full sensing or partial sensing, a resource may be selected from resources indicated by the physical layer of the first UE within the indicated SL DRX active time.

The selected resource may be time and frequency resources for one transmission opportunity.

According to the above-described S1310, an operation in which the first UE (100/200 in FIGS. 15 to 20) create a sidelink grant related to resource allocation mode 2 may be implemented by the apparatus of FIGS. 15 to 20. For example, referring to FIG. 16, one or more processors 102 may control one or more transceivers 106 and/or one or more memories 104 to operate to create a sidelink grant related to resource allocation mode 2.

In S1320, the first UE transmits the PSCCH to the second UE. The PSCCH may be transmitted based on S610 in (b) of FIG. 6. That is, the first UE may transmit the PSCCH using the resource allocation mode 2.

According to the above-described S1320, an operation in which the first UE (100/200 in FIGS. 15 to 20) transmits the PSCCH to the second UE (100/200 in FIGS. 15 to 20) may be implemented by the apparatus of FIGS. 15 to 20. For example, referring to FIG. 16, one or more processors 102 may control one or more transceivers 106 and/or one or more memories 104 to transmit the PSCCH to the second UE 200.

In S1330, the first UE transmits the PSSCH to the second UE. The PSSCH may be transmitted based on S620 in (b) of FIG. 6. Transmission of the PSSCH may be related to transmission of the PSCCH. The PSCCH and the PSSCH may be transmitted in resources based on the resource allocation mode 2. A resource based on the resource allocation mode 2 may be a resource selected again by a trigger for resource reselection.

According to the above-described S1330, an operation in which the first UE (100/200 in FIGS. 15 to 20) transmits the PSSCH to the second UE (100/200 in FIGS. 15 to 20) may be implemented by the apparatus of FIGS. 15 to 20. For example, referring to FIG. 16, one or more processors 102 may control one or more transceivers 106 and/or one or more memories 104 to transmit the PSSCH to the second UE 200.

Hereinafter, the above-described embodiments will be described in detail with reference to FIG. 14 in terms of operation of the second UE. The methods described below are only classified for convenience of description, and it goes without saying that some components of one method may be substituted with some components of another method, or may be applied in combination with each other, unless mutually excluded.

Figure 14:
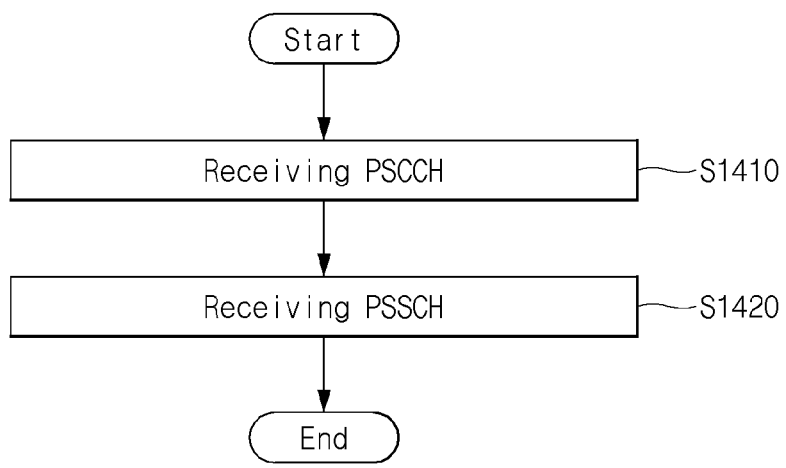
FIG. 14 is a flowchart for explaining a method for a second user equipment (UE) to perform sidelink communication in a wireless communication system according to another embodiment of the present disclosure.

FIG. 14 is a flowchart for explaining a method for a second user equipment (UE) to perform sidelink communication in a wireless communication system according to another embodiment of the present disclosure.

Referring to FIG. 14, a method for a second user equipment (UE) to perform sidelink communication in a wireless communication system according to another embodiment of the present disclosure includes receiving a PSCCH (S1410) and receiving a PSSCH (S1420).

In the following description, the first UE may mean the above-described SL DRX-related Tx UE (e.g., first UE in FIG. 6 (*b*)), and the second UE may mean the above-described SL DRX-related Rx UE (e.g., second UE in FIG. 6 (*b*)). In addition, the first UE may mean a UE transmitting sidelink data (UE transmitting SL-SCH Data in Table 15), and the second UE may mean a UE receiving sidelink data (UE receiving SL-SCH Data in Table 14).

In S1410, the second UE receives the PSCCH from the first UE. The PSCCH may be received based on S610 in (b) of FIG. 6. That is, the second UE may receive the PSCCH in a resource based on the resource allocation mode 2.

According to the above-described S1410, an operation in which the second UE (100/200 in FIGS. 15 to 20) receives the PSCCH from the first UE (100/200 in FIGS. 15 to 20) may be implemented by the apparatus of FIGS. 15 to 20. For example, referring to FIG. 16, one or more processors 202 may control one or more transceivers 206 and/or one or more memories 204 to receive the PSCCH from the first UE 100.

In S1420, the second UE receives the PSSCH from the first UE. The PSSCH may be received based on S620 in (b) of FIG. 6. Transmission of the PSSCH may be related to transmission of the PSCCH. The PSCCH and the PSSCH may be received in a resource based on the resource allocation mode 2.

The resource based on the resource allocation mode 2 may be related to a sidelink grant created by the first UE. It is described in detail below. The first UE creates a sidelink grant related to resource allocation mode 2. The sidelink grant may mean the above-described selected sidelink grant.

Based on the sidelink grant, a set of at least one duration related to a Physical Sidelink Control Channel (PSCCH) and a set of at least one duration related to a Physical Sidelink Shared Channel (PSSCH) are determined. That is, the MAC entity of the first UE may determine a set of PSCCH duration(s) and a set of PSSCH duration(s) based on the sidelink grant. Transmission of SCI may occur in the set of PSSCH duration(s). Transmission of sidelink data (SL-SCH) related to the SCI may occur in the set of PSSCH duration(s). That is, the second UE may receive the SCI in the set of PSCCH duration(s). The second UE may receive sidelink data (SL-SCH) related to the SCI in the set of PSSCH duration (s).

The creation of the sidelink grant may correspond to the resource selection operation in FIG. 6 (*b*). For example, the set of PSCCH duration(s) and the set of PSSCH duration(s) determined based on the sidelink grant may be based on resources selected based on resource allocation mode 2.

According to an embodiment, based on the second UE behaving based on a SideLink Discontinuous Reception (SL DRX) configuration, the resource based on the resource allocation mode 2 may be a resource in a SL DRX active time of the second UE. That is, the resource based on the resource allocation mode 2 may be a resource selected by the first UE or a resource reselected by the first UE.

As a specific example, based on 1) the second UE behaving based on a SideLink Discontinuous Reception (SL DRX) configuration, and 2) the at least one duration related to the PSCCH and a second stage SCI related to the PSSCH, for transmission of a Medium Access Control Protocol Data Unit (MAC PDU) which is based on the sidelink grant, not being in a SL DRX active time of the second UE: a resource based on the resource allocation mode 2 may be a resource reselected by the first UE. In other words, based on the PSCCH duration (s) and second stage SCI for transmission of the MAC PDU (e.g. all transmissions) based on the sidelink grant not being in the SL DRX active time of the receiving UE, the resource based on the resource allocation mode 2 may be a resource reselected by the first UE.

At this time, the first UE (MAC entity) may clear the sidelink grant. Specifically, reselection of resources based on the resource allocation mode 2 may be triggered after the sidelink grant is cleared.

The resource based on the resource allocation mode 2 may be a resource selected by a trigger for resource reselection as described above. The resource (re)selection method based on the resource allocation mode 2 may be configured as full sensing, partial sensing, or random selection. A resource selection method based on sensing (full sensing or partial sensing) is a method in which a resource is selected based on a sensing result performed on all or part of a sensing window. A resource selection method based on random selection is a method in which resources in a pre-configured resource pool are randomly selected.

According to an embodiment, the SL DRX active time may be determined based on the SL DRX timer. That is, the first UE (Tx UE) may determine the SL DRX active time based on the SL DRX timer of the second UE (Rx UE). This embodiment may be based on the operation of UE transmitting SL-SCH Data in Table 15. The SL DRX timer may include an SL DRX timer running in the second UE or an SL DRX timer to be run in the second UE. The SL DRX timer may include at least one of SL DRX onDurationTimer, SL DRX InactivityTimer, and SL DRX RetransmissionTimer.

According to an embodiment, based on the reselection of the resource based on the resource allocation mode 2 being triggered, an MAC entity of the first UE may indicate the SL DRX active time of the second UE to a physical layer of the first UE.

In the case of a random selection based method, a resource based on resource allocation mode 2 may be selected from a pre-configured resource pool. According to one embodiment, based on a resource selection mechanism related to the resource allocation mode 2 being random selection, a resource may be selected from a resource pool within the indicated SL DRX active time. That is, the resource based on the resource allocation mode 2 may be a resource selected from a resource pool within the indicated SL DRX active time. The second UE may receive the PSCCH and the PSSCH in a resource selected from a resource pool within the indicated SL DRX active time.

In the case of the sensing based resource selection method, a resource based on resource allocation mode 2 may be selected from among resources indicated by a physical layer of the first UE. According to an embodiment, based on the resource selection mechanism related to the resource allocation mode 2 being full sensing or partial sensing, a resource may be selected from resources indicated by the physical layer of the first UE within the indicated SL DRX active time. That is, the resource based on the resource allocation mode 2 may be a resource selected from resources indicated by the physical layer of the first UE within the indicated SL DRX active time. The second UE may receive the PSCCH and the PSSCH in a resource selected from resources indicated by the physical layer of the first UE within the indicated SL DRX active time.

The selected resource may be time and frequency resources for one transmission opportunity.

According to the above-described S1420, an operation in which the second UE (100/200 in FIGS. 15 to 20) receives the PSSCH from the first UE (100/200 in FIGS. 15 to 20) may be implemented by the apparatus of FIGS. 15 to 20. For example, referring to FIG. 16, one or more processors 202 may control one or more transceivers 206 and/or one or more memories 204 to receive the PSSCH from the first UE 100.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
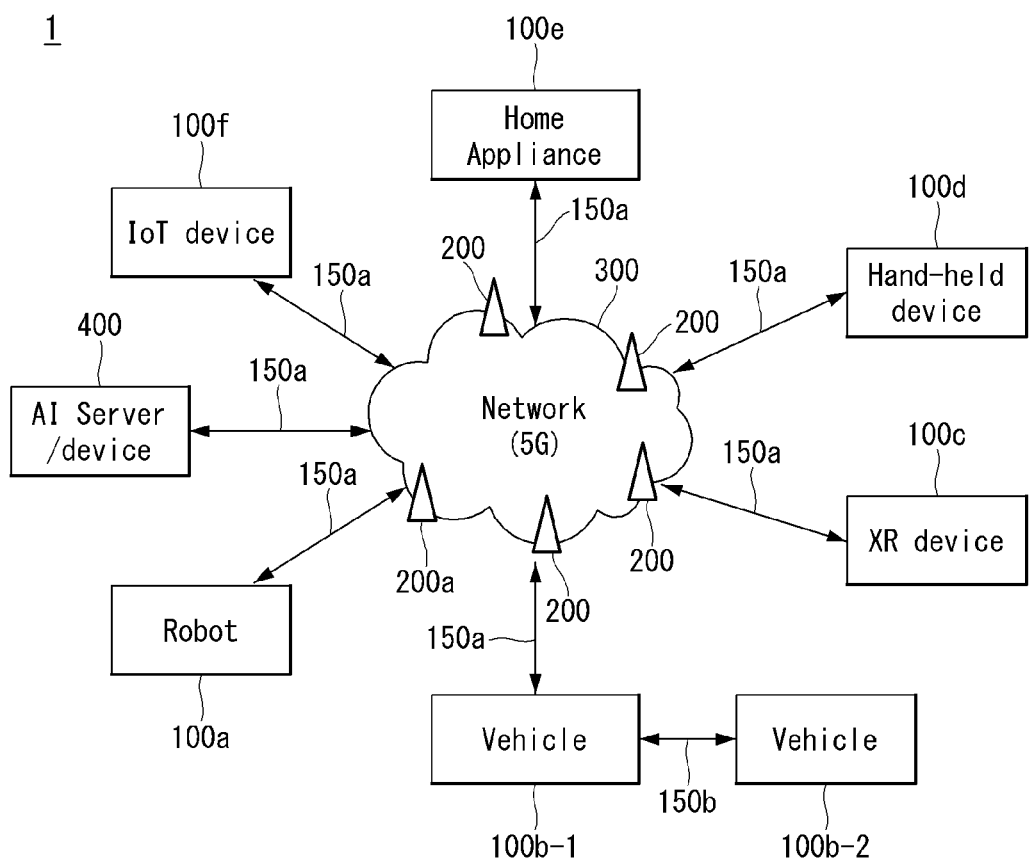
FIG. 15 shows a communication system 1 based on an embodiment of the present disclosure.

FIG. 15 shows a communication system 1 based on an embodiment of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 16 shows wireless devices based on an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) based on the descriptions, functions, procedures, proposals, methods, and/or operational flowcharts disclosed in this document. The one or more processors 102 and 202 may generate messages, control information, data, or information based on the descriptions, functions, procedures, proposals, methods, and/or operational flowcharts disclosed in this document. The one or more processors 102 and 202 may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information based on the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
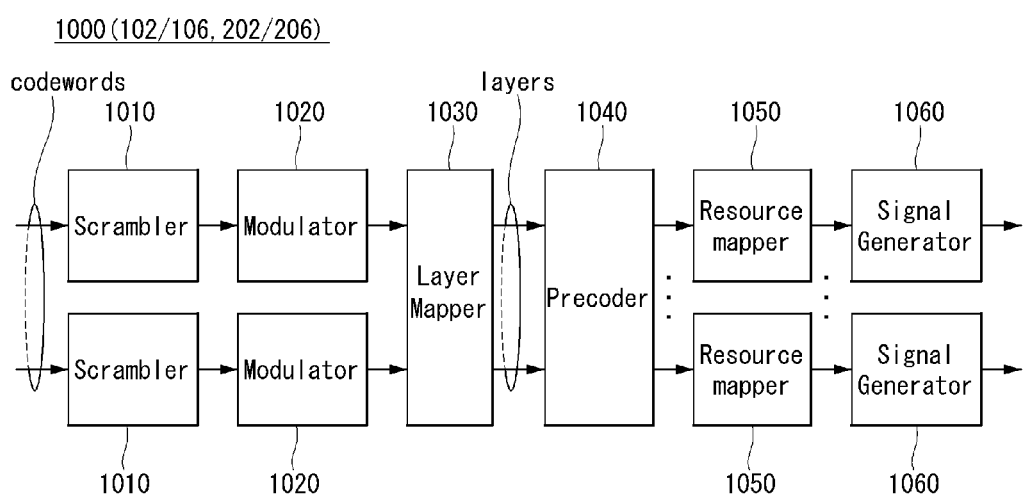
FIG. 17 shows a signal process circuit for a transmission signal based on an embodiment of the present disclosure.

FIG. 17 shows a signal process circuit for a transmission signal based on an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
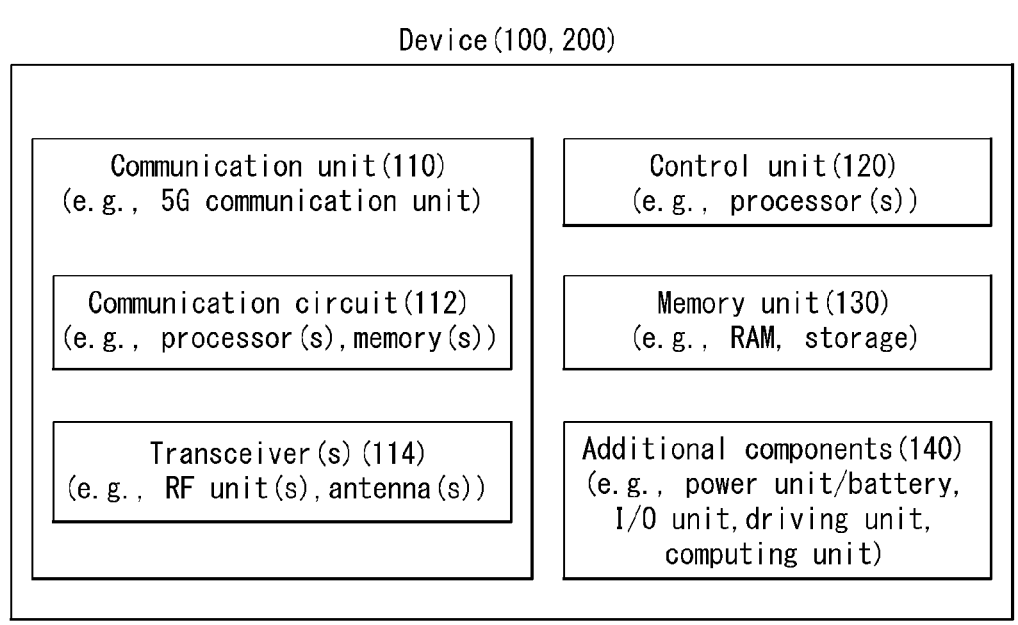
FIG. 18 shows another example of a wireless device based on an embodiment of the present disclosure.

FIG. 18 shows another example of a wireless device based on an embodiment of the present disclosure. The wireless device may be implemented in various forms based on a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place based on a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
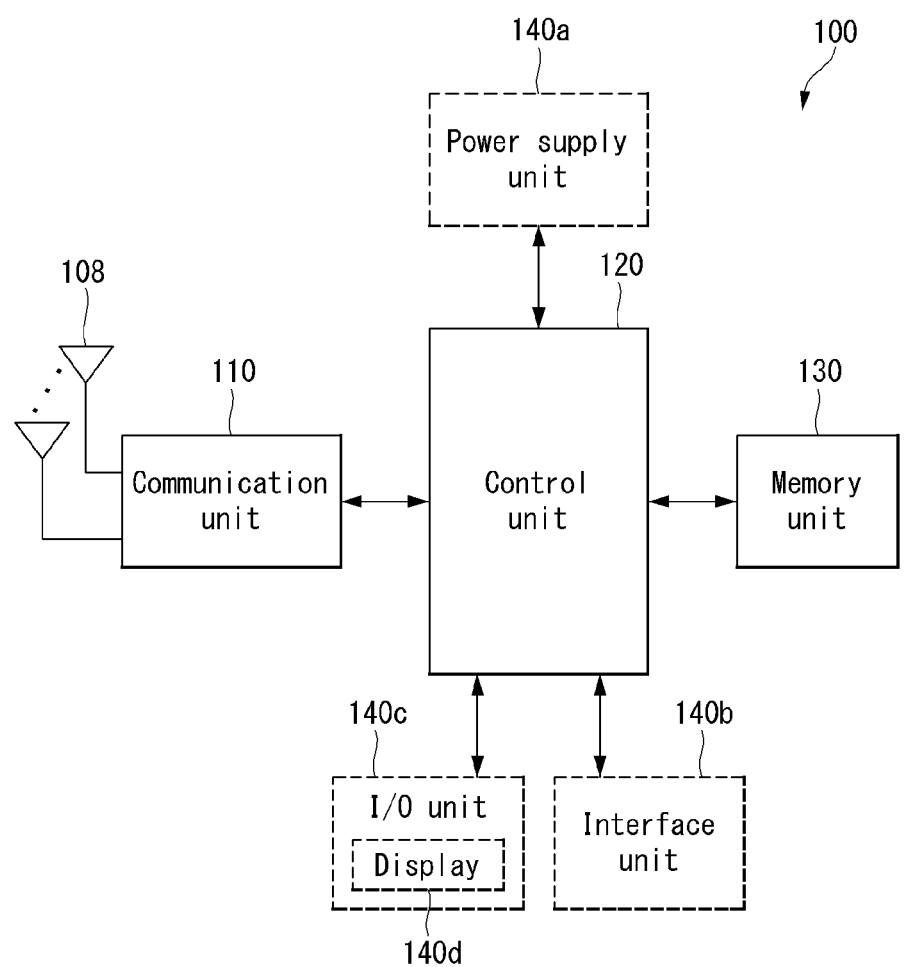
FIG. 19 shows a hand-held device based on an embodiment of the present disclosure

FIG. 19 shows a hand-held device based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
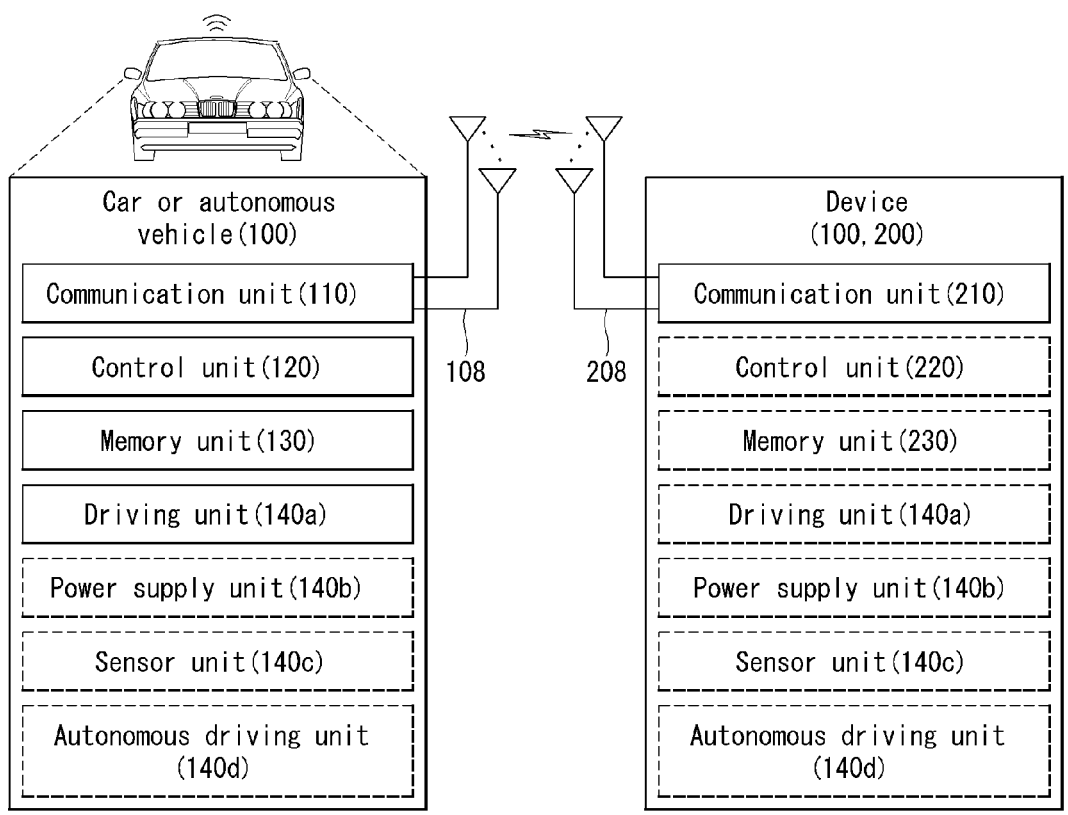
FIG. 20 shows a vehicle or an autonomous vehicle based on an embodiment of the present disclosure.

FIG. 20 shows a vehicle or an autonomous vehicle based on an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path based on the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims described in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first user equipment (UE), the method comprising:
    creating a sidelink grant related to resource allocation mode 2, wherein a set of at least one duration related to a Physical Sidelink Control Channel (PSCCH) and a set of at least one duration related to a Physical Sidelink Shared Channel (PSSCH) are determined based on the sidelink grant;
    transmitting, to a second UE, the PSCCH; and
    transmitting, to the second UE, the PSSCH
    wherein the PSCCH and the PSSCH are transmitted based on resources which are selected based on the resource allocation mode 2,
    wherein, based on 1) the second UE behaving based on a SideLink Discontinuous Reception (SL DRX) configuration, and 2) the at least one duration related to the PSCCH and a second stage SCI related to the PSSCH, for transmission of a Medium Access Control Protocol Data Unit (MAC PDU) which is based on the sidelink grant, not being in a SL DRX active time of the second UE:
    a reselection of the resources based on the resource allocation mode 2 is triggered,
    wherein, based on the reselection of the resources based on the resource allocation mode 2 being triggered, a MAC entity of the first UE indicates the SL DRX active time of the second UE to a physical layer of the first UE,
    wherein, for a resource selection mechanism related to the resource allocation mode 2 being a random selection, the resources are selected from a resource pool within the indicated SL DRX active time, and
    wherein, for the resource selection mechanism related to the resource allocation mode 2 being a sensing based selection, the resources are selected from resources indicated by the physical layer of the first UE within the indicated SL DRX active time.

2. The method of claim 1, wherein the SL DRX active time is determined based on an SL DRX timer, and
    the SL DRX timer includes an SL DRX timer running in the second UE or an SL DRX timer to be run in the second UE.

3. The method of claim 1, wherein the sensing based selection is based on at least one of a full sensing and/or a partial sensing.

4. The method of claim 1, wherein the selected resource is time and frequency resources for one transmission opportunity.

5. The method of claim 2, wherein the SL DRX timer includes at least one of SL DRX onDurationTimer, SL DRX InactivityTimer, or SL DRX RetransmissionTimer.

6. The method of claim 1, wherein after the sidelink grant is cleared, the reselection of resource based on the resource allocation mode 2 is triggered.

7. The method of claim 1, wherein the MAC PDU is created based on selection of a logical channel related to the sidelink grant, and
    the logical channel is a logical channel to which a destination that is in the SL DRX active time belongs.

8. The method of claim 7, wherein the MAC PDU is obtained from the sidelink grant,
    based on the at least one duration related to the PSCCH for transmission of the MAC PDU which is based on the sidelink grant and the second stage SCI related to the PSSCH, not being in the SL DRX active time of the second UE, the MAC PDU is not obtained from the sidelink grant and the sidelink grant is not used.

9. A first user equipment (UE) comprising:

one or more transceivers;

one or more processors controlling the one or more transceivers; and one or more memories operably connected to the one or more processors, wherein the one or more memories store instructions for performing operations based on being executed by the one or more processors, wherein the operations includes:

creating a sidelink grant related to resource allocation mode 2, wherein a set of at least one duration related to a Physical Sidelink Control Channel (PSCCH) and a set of at least one duration related to a Physical Sidelink Shared Channel (PSSCH) are determined based on the sidelink grant;

transmitting, to a second UE, the PSCCH; and transmitting, to the second UE, the PSSCH wherein the PSCCH and the PSSCH are transmitted based on resources which are selected based on the resource allocation mode 2, wherein, based on 1) the second UE behaving based on a SideLink Discontinuous Reception (SL DRX) configuration, and 2) the at least one duration related to the PSCCH and a second stage SCI related to the PSSCH, for transmission of a Medium Access Control Protocol Data Unit (MAC PDU) which is based on the sidelink grant, not being in a SL DRX active time of the second UE:

a reselection of the resources based on the resource allocation mode 2 is triggered, wherein, based on the reselection of the resources based on the resource allocation mode 2 being triggered, a MAC entity of the first UE indicates the SL DRX active time of the second UE to a physical layer of the first UE, wherein, for a resource selection mechanism related to the resource allocation mode 2 being a random selection, the resources are selected from a resource pool within the indicated SL DRX active time, and wherein, for the resource selection mechanism related to the resource allocation mode 2 being a sensing based selection, the resources are selected from resources indicated by the physical layer of the first UE within the indicated SL DRX active time.

* * * * *